(12) United States Patent
Ikeda et al.

(10) Patent No.: US 11,800,047 B2
(45) Date of Patent: Oct. 24, 2023

(54) IMAGE PROCESSING DEVICE, IMAGE PROCESSING METHOD, AND PROGRAM

(71) Applicant: SONY GROUP CORPORATION, Tokyo (JP)

(72) Inventors: Hiroshi Ikeda, Tokyo (JP); Nobuho Ikeda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/438,651

(22) PCT Filed: Feb. 4, 2020

(86) PCT No.: PCT/JP2020/004030
§ 371 (c)(1),
(2) Date: Sep. 13, 2021

(87) PCT Pub. No.: WO2020/189057
PCT Pub. Date: Sep. 24, 2020

(65) Prior Publication Data
US 2022/0191406 A1 Jun. 16, 2022

(30) Foreign Application Priority Data
Mar. 20, 2019 (JP) .................................. 2019-052848

(51) Int. Cl.
*H04N 5/268* (2006.01)
*H04N 5/765* (2006.01)
(Continued)

(52) U.S. Cl.
CPC ............. *H04N 5/268* (2013.01); *H04N 5/765* (2013.01); *H04N 7/08* (2013.01); *H04N 9/7921* (2013.01)

(58) Field of Classification Search
CPC .......... H04N 5/268; H04N 5/765; H04N 7/08; H04N 9/7921
See application file for complete search history.

(56) References Cited

U.S. PATENT DOCUMENTS

2008/0019661 A1* 1/2008 Obrador ................. H04N 5/147 386/210
2010/0094441 A1* 4/2010 Mochizuki ........... G11B 27/105 382/190
(Continued)

FOREIGN PATENT DOCUMENTS

| JP | 2003-304418 A | 10/2003 |
|----|---------------|---------|
| JP | 2007-158860 A | 6/2007 |
| JP | 2014-30069 A | 2/2014 |

OTHER PUBLICATIONS

International Search Report dated Apr. 14, 2020 in PCT/JP2020/004030 filed on Feb. 4, 2020, 2 pages.
(Continued)

*Primary Examiner* — Thai Q Tran
*Assistant Examiner* — Jose M Mesa
(74) *Attorney, Agent, or Firm* — Oblon, McClelland, Maier & Neustadt, L.L.P.

(57) ABSTRACT

One image to serve as a main image is selected among a plurality of images and a continuous period length for which a selected image is continued as the main image is set in accordance with an image classification to which the selected image corresponds among a plurality of image classifications.

18 Claims, 20 Drawing Sheets

(51) Int. Cl.
*H04N 7/08* (2006.01)
*H04N 9/79* (2006.01)

(56) References Cited

U.S. PATENT DOCUMENTS

2013/0301934 A1\* 11/2013 Cok .................... G11B 27/034
                                                                            382/218
2015/0186002 A1\* 7/2015 Suzuki ................. G06F 3/0482
                                                                            715/830

OTHER PUBLICATIONS

Inoue, T. et al., "Videoconferencing System Based on TV Programs," Transactions of Information Processing Society of Japan, vol. 37, No. 11, 1996, pp. 2095-2104 (with English abstract).
Extended European Search Report dated Mar. 21, 2022, in corresponding European Patent Application No. 20774738.7, 20 pages.
Jinjun Wang et al: "Automatic composition of broadcast sports video", Multimedia Systems, vol. 14, No. 4, XP019632565, Mar. 11, 2008, pp. 179-193, ISSN: 1432-1882.

\* cited by examiner

IMAGE PROCESSING DEVICE, IMAGE PROCESSING METHOD, AND PROGRAM

TECHNICAL FIELD

The present technology relates to an image processing device, an image processing method, and a program, and more particularly to the technical field of image switching.

BACKGROUND ART

In image content generated for broadcasting, delivery, or the like, captured images (shots) captured by a plurality of cameras are switched in accordance with details of scenes which are being imaged in many cases. Thus, interesting image content with a sense of presence can be produced.

In recent years, platforms for delivery of images such as moving images have diversified and demands for production of images or delivery of images have increased. In particular, devices that have automatic switching functions of automatically switching images, for example, to produce or deliver live videos even among small numbers of people or people who have no technical knowledge have been developed.

The following PTL 1 discloses a technology for automatically selecting captured images to be used among captured images transmitted simultaneously in parallel from a plurality of cameras.

CITATION LIST

Patent Literature

[PTL 1]
JP 2007-158860 A

SUMMARY

Technical Problem

Incidentally, in switching of images (shots) in a moving image or the like, a timing of the switching is an important element for keeping viewers interested in the images. When one scene is too long or too short, a viewer may feel discomfort or may lose interest in some cases. Further, an appropriate time period for which shots of a certain camera continue differs depending on details of images of the shots. Therefore, it is difficult to perform automatic switching of screens as performed by an experienced switching staff. For example, in the case of automatic switching, since a continuous period length of each shot is constant, image content may not be interesting enough or a flow of the image content may be unnatural.

Accordingly, the present disclosure proposes a technology for performing switching control in consideration of the length of a period for which selected images are continued when the images are automatically selected among a plurality of images to be used for broadcasting, delivery, or the like.

Solution to Problem

According to an aspect of the present technology, an image processing device includes: a main image selection unit configured to select one image as a main image among a plurality of images; and a period setting unit configured to set a continuous period length for which a selected selection image selected by the main image selection unit is continued as the main image in accordance with an image classification to which the selection image corresponds among a plurality of image classifications.

The main image is an image used on a time axis or for a certain period length in a switching process for real-time broadcasting, delivery, recording, transmission, or the like of image content that has a length in a time axis direction as a slide show or the like of a moving image or a still image. For example, the main image is an image used for content of a moving image output for broadcasting or the like in the switching process.

For example, when an event is imaged with a plurality of cameras and real-time broadcasting or the like is performed, a plurality of images are captured by the cameras and an image captured by a certain camera and output in current broadcasting or the like corresponds to the main image mentioned here.

When an event is imaged with one camera and real-time broadcasting is performed, an image of a certain cut image output in current broadcasting or the like also corresponds to the main image mentioned here among a plurality of images in which regions cut from an image captured by the camera are changed.

In the image processing device according to the present technology, it is conceivable that the continuous period length is a length of a period from when the selection image is switched to the main image until another image selected after the selection image among the plurality of images by the main image selection unit is switched to a main image.

For example, an image output as a broadcasting image or the like is switched so that the main image is switched in sequence. An example of the continuous period length is assumed to be a period length for which one image is adopted as the main image.

In the image processing device according to the present technology, it is conceivable that the image classification is determined based on subject information of an image.

It is conceivable that the image classifications are, for example, a whole image, a main member image, a support member image, and a speaker image. The image classification may be set in advance for each image or classified through a user operation, or may be determined based on the subject information. For example, a subject is determined through image analysis and the corresponding image classification is determined.

In the image processing device according to the present technology, it is conceivable that the image processing device further includes a switching control unit configured to perform control such that the main image is switched from the selection image to another image among the plurality of images when the continuous period length is reached or when a predetermined situation is detected and a continuous period of a current main image passes a first period length shorter than the continuous period length.

The main image is switched to another image in some cases even when the continuous period length set for an image serving as a current main image is not reached.

In the image processing device according to the present technology, it is conceivable that, when an image classification of an image serving as a main image is changed from the image classification upon selection of the selection image as the main image by the main image selection unit, the switching control unit performs control such that the main image is switched to another image under a condition that the first period length shorter than the continuous period length set by the period setting unit passes.

That is, the image serving as the main image is selected in accordance with the image classification. When the image classification of the image serving as the main image is changed, the main image is switched in some cases irrespective of the set continuous period length.

In the image processing device according to the present technology, it is conceivable that, when an image of which the image classification is a main subject image occurs in an image not serving as the main image, the switching control unit performs control such that the main image is switched to an image of the image classification indicating the main image as a main subject image, under a condition that the continuous period passes the first period length shorter than the continuous period length set by the period setting unit.

The main subject image is an image including a specific person or the like who is a main member, an image including a person who is performing a main action in an imaging scene (for example, a speaker), or the like.

For example, when the main subject is changed, an image of which the image classification indicating that the main subject is included becomes different. Accordingly, when the image classification becomes the image classification indicating that an image different from the current main image includes the main subject, the main image is switched irrespective of the set continuous period length in some cases.

In the image processing device according to the present technology, it is conceivable that, when a period for which the image classification of an image is a whole image is not a main image passes a second period length, the main image selection unit selects the image of the image classification indicating the whole image as a new main image among the plurality of images.

It is conceivable that the whole image is, for example, an image in which a scene is imaged at the widest angle among the plurality of images. For example, the whole image is an image in which a plurality of people or the like are included or an individual person or the like is shown relatively small.

For example, the second period length is a period length set to be longer than a maximum value of the continuous period length set by the period setting unit and is a period length serving as a reference of a period for which non-display of the whole image is allowed. In other words, a period length for which the whole image may be displayed after the second period length passes without displaying the whole image is set.

In the image processing device according to the present technology, it is conceivable that the image classification is an image classification including one of at least a main subject image, a sub-subject image, and a whole image.

The sub-subject image is an image including a person or the like other than a person such as a main member corresponding to the above-described main subject image. For the main subject image, the sub-subject image, and the whole image, the continuous period length of the main image is set differently.

In the image processing device according to the present technology, it is conceivable that the period setting unit sets the continuous period length in accordance with the image classification so that the main subject image has a longest continuous period length and the whole image has a shortest continuous period length.

For example, the continuous period length is set so that the relation of the main subject image>the sub-subject image>the whole image is satisfied.

Alternatively, the continuous period length is set so that the relation of the main subject image>the whole image>the sub-subject image is satisfied.

In the image processing device according to the present technology, it is conceivable that the main image selection unit selects an image serving as a subsequent main image through a process in accordance with a predetermined selection rule among the plurality of images other than the image serving as the main image.

The selection of the subsequent main image may be random selection from all the images or a predetermined selection rule may be provided for selection.

In the image processing device according to the present technology, it is conceivable that one process in accordance with the selection rule is a process of, when the image serving as the main image is not a main subject image and there is an image serving as another main subject image, setting the image serving as the other main subject image as a candidate for the subsequent main image. When the current main image is not the main subject image, a viewer may not feel discomfort despite a different main subject image being selected as the main image.

In the image processing device according to the present technology, it is conceivable that one process in accordance with the selection rule is a process of, when the image serving as the main image is a main subject image and there is an image serving as another main subject image, setting the image serving as the other main subject image as a candidate for the subsequent main image.

When the current main image is the main subject image and there is a different main subject image, a viewer may not feel discomfort despite the different main subject image being the subsequent main image.

In the image processing device according to the present technology, it is conceivable that one process in accordance with the selection rule is a process of excluding an image of the same image classification as the image serving as the main image from candidates for the subsequent main image.

The image of the same image classification as the current main image is not continued as the main image.

In the image processing device according to the present technology, it is conceivable that one process in accordance with the selection rule is a process of excluding an image including the same sub-subject as a subject of the image serving as the main image from candidates for the subsequent main image. The image of the same image classification as the current main image is not continued as the main image.

In the image processing device according to the present technology, it is conceivable that one process in accordance with the selection rule is a process of excluding a sub-subject image from candidates for a subsequent main image when the image serving as the main image is a whole image and the main subject image is another image among the plurality of images.

The support member is displayed as little as possible at a timing after the whole image is displayed.

In the image processing device according to the present technology, it is conceivable that the main image selection unit selects a whole image as the subsequent main image through the process in accordance with the selection rule when there is no more image which is a candidate for the image serving as the subsequent main image other than the whole image.

In the selection rule, all the images or all the images except for the whole image are unselectable in some cases. In this case, the whole image is selected as the subsequent main image.

In the image processing device according to the present technology, it is conceivable that the main image selection unit selects an image serving as a subsequent main image through a weighted selection process on each image among images which are candidates for the subsequent main image.

In the selection of the subsequent main image, all the images are selected as candidates through lottery processing, or candidates for an image selected by providing a predetermined selection rule are determined and the main image is selected from the images which are the candidates through the lottery processing. At this time, weighted lottery is performed.

In the image processing device according to the present technology, it is conceivable that, when there is no main subject image among images which are candidates for the subsequent main image, the main image selection unit selects a subsequent main image through random lottery processing on the images which are the candidates.

When the candidates are selected in accordance with the selection rule and there is no main subject image among the candidates, the subsequent main image is selected at random.

According to another aspect of the present technology, an image processing method performed by an image processing device includes: selecting one image as a main image among a plurality of images; and setting a continuous period length for which a selected selection image is continued as the main image in accordance with an image classification to which the selection image corresponds among a plurality of image classifications.

That is, the period length of the main image through the switching process is set differently in accordance with the image classification.

The program according to still another aspect of the present technology is a program causing the information processing device to perform the process of the image processing method. For example, the technology of the present disclosure can be performed by an information processing device or a processor in an imaging device, a switcher device, a general-purpose terminal device, or the like.

DESCRIPTION OF EMBODIMENTS

Figure 1:
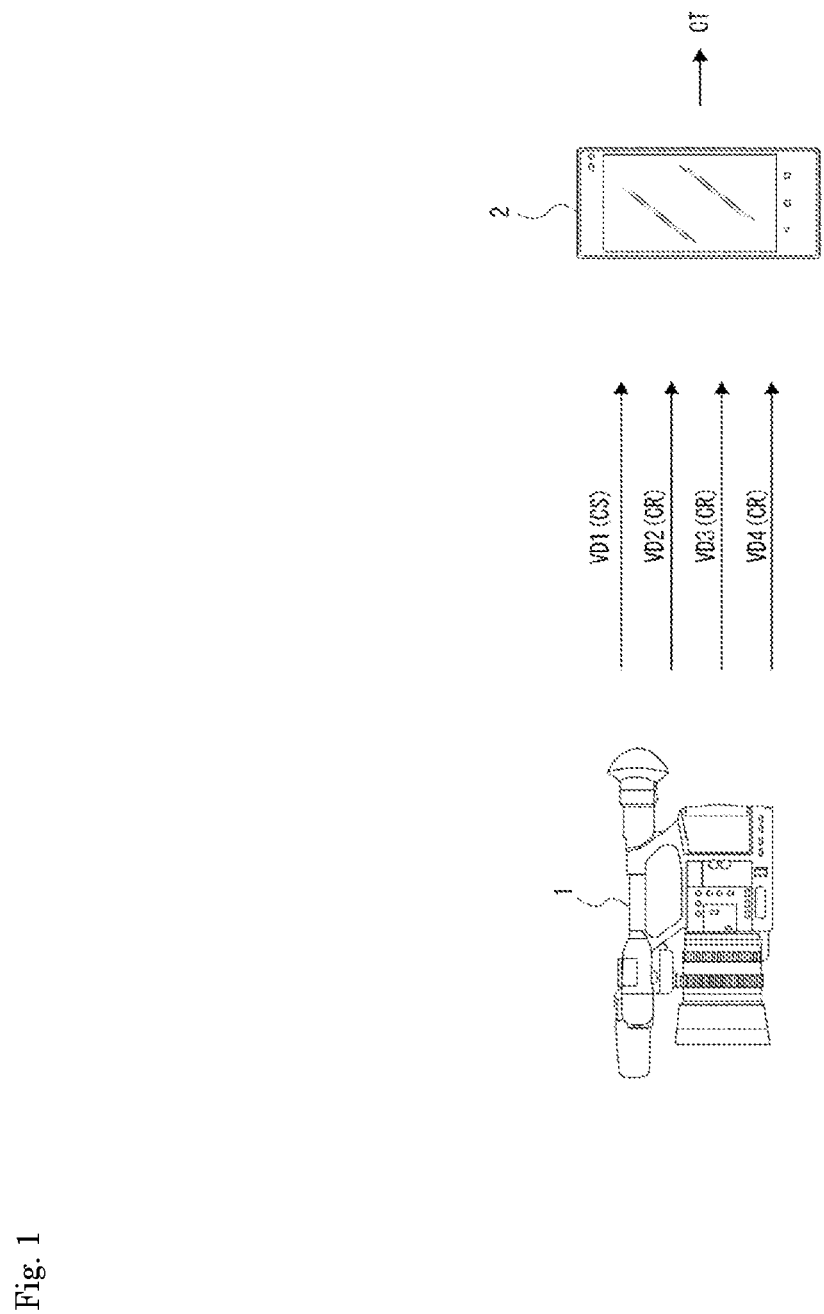
FIG. 1 is a diagram illustrating an example of a configuration of a device that realizes an operation according to an embodiment.

Hereinafter, embodiments will be described in the following order.

<1. Configuration of device applied as image processing device>
<2. Example of functional configuration of image processing device>
<3. Automatic control of shot switching>
<4. Example of process according to first embodiment>
<5. Example of process according to second embodiment>
<6. Conclusion and modification examples>

Terms used for description of embodiments will be described.

An "image" is an image such as a moving image or a still image and is an image which is captured by an imaging device, is a switching processing target, and is used for image content for broadcasting or the like particularly in description of the embodiments. The image is an image in a whole image frame captured by an imaging device or an image or the like of a region cut (cropped) from a captured image, and is the entirety or a part of an image which is a so-called camera shot. Such a captured image which is a switching target is referred to as a "shot".

A "main image" is an image (shot) used on a time axis or for a certain period length in a switching process for real-time broadcasting, delivery, recording, transmission, or the like of image content that has a length in a time axis direction as a slide show or the like of a moving image or a still image. That is, the main image is a shot selected in a switching process and used as moving image content output for broadcasting or the like.

Any of a plurality of shots is selected as a main image in sequence.

An "image classification" is a subject of a shot or a classification in accordance with image content decided through camerawork.

In an embodiment, a "main subject shot", a "support shot", and a "whole shot" can be exemplified as image classifications of shots.

A "main shot" and a "speaker shot" can be exemplified as sub-classifications of the "main subject shot".

The "main subject shot" is a shot including a main subject (a person, an animal, a landscape, or the like) in an event or the like which is being imaged. In a broad sense, the main subject shot is a shot including a main subject (a support member or the like is included in some cases). In a narrow sense, the main subject shot is a shot including only a main subject and a background. In a process according to the embodiment, either of the broad sense and the narrow sense may be adopted.

In the embodiment, an example in which a "main subject shot" includes a "main shot" or a "speaker shot" will be described.

The "main shot" is, for example, a shot in which a person determined in advance as a main member (a person serving as a main member in an event or the like) is imaged. For example, in a concert of a musician A, a shot in which the musician A is imaged is a main shot.

The "speaker shot" is a shot in which a person who is speaking at that time is imaged.

The "support shot" is a shot that includes a subject (a person, an animal, a landscape, or the like) which is not a main subject in an event or the like which is being imaged. For example, in the concert of the musician A, a shot in which a background musician of the musician A is imaged is a support shot.

The "whole shot" is, for example, a shot in which an event is imaged as a whole. For example, an image at a widest angle, an image in which the number of people who are subjects is the largest, an image in which the size of a person who is a subject is the smallest, an image in which a stage or the like is put closest to the front, or the like may be determined as a whole shot among shots.

Each shot is not necessarily fixed as a "main subject shot", a "support shot", a "whole shot", or the like. Each shot is changed to a "main subject shot", a "support shot", a "whole shot", or the like depending on an imaged subject or a situation. Here, an image classification of each shot is fixed in some cases in accordance with content of camerawork or a cutting process.

1. Configuration of Device Applied as Image Processing Device

An image processing device according to an embodiment of the present disclosure can be realized in any of various devices. First, a device to which the technology of the present disclosure can be applied will be described.

FIG. 1 illustrates an example in which a portable terminal 2 functions as an image processing device according to the present technology. The portable terminal 2 is a device such as a smartphone or a tablet device.

Shots VD1, VD2, VD3, and VD4 are transmitted a captured moving image from one imaging device 1 to the portable terminal 2. Hereinafter, when the plurality of shots are not distinguished from each other and are generally named or one certain shot which is not particularly limited is indicated, the term "shot VD" is used.

Communication between the imaging device 1 and the portable terminal 2 may be performed through, for example, wired communication or wireless communication (for example, short-range wireless communication or the like).

Here, in FIG. 1, the suffix "(CS)" is added to the shot VD1 and indicates a captured image at a whole angle of field.

The suffix "(CR)" is added to the shots VD2, VD3, and VD4 and indicates an image cut (cropped) from a captured image at a whole angle of field.

That is, the imaging device 1 performs imaging of an event or the like, outputs the captured image as the shot VD1, and outputs cropped images in which predetermined regions are cut out from the captured images as the shots VD2, VD3, and VD4.

Figure 2:
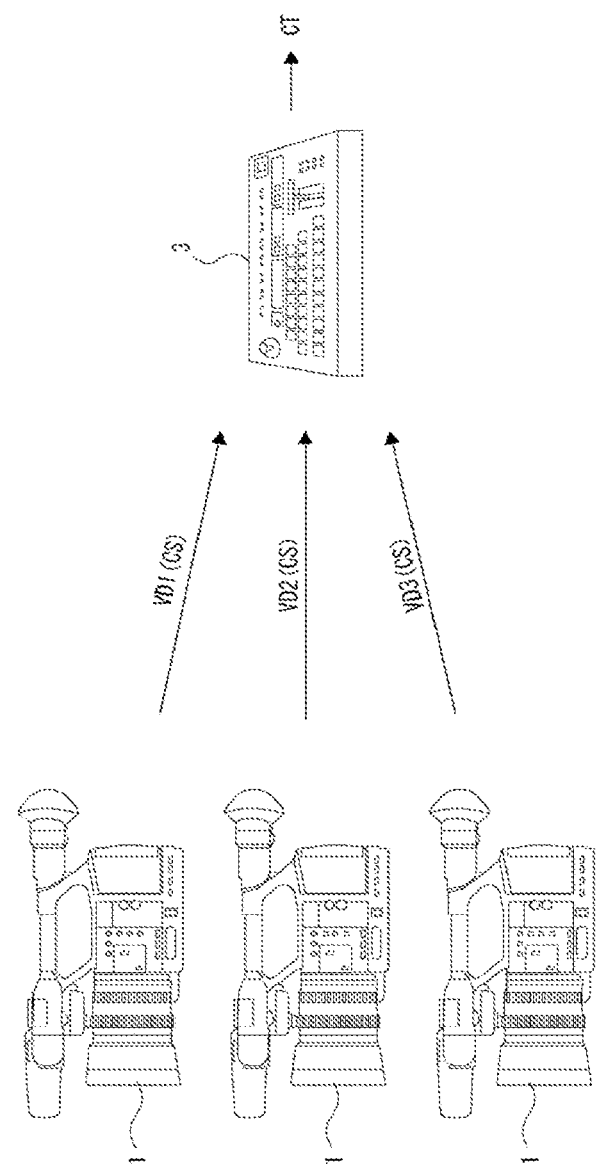
FIG. 2 is a diagram illustrating an example of a configuration of the device that realizes an operation according to the embodiment.
Figure 3:
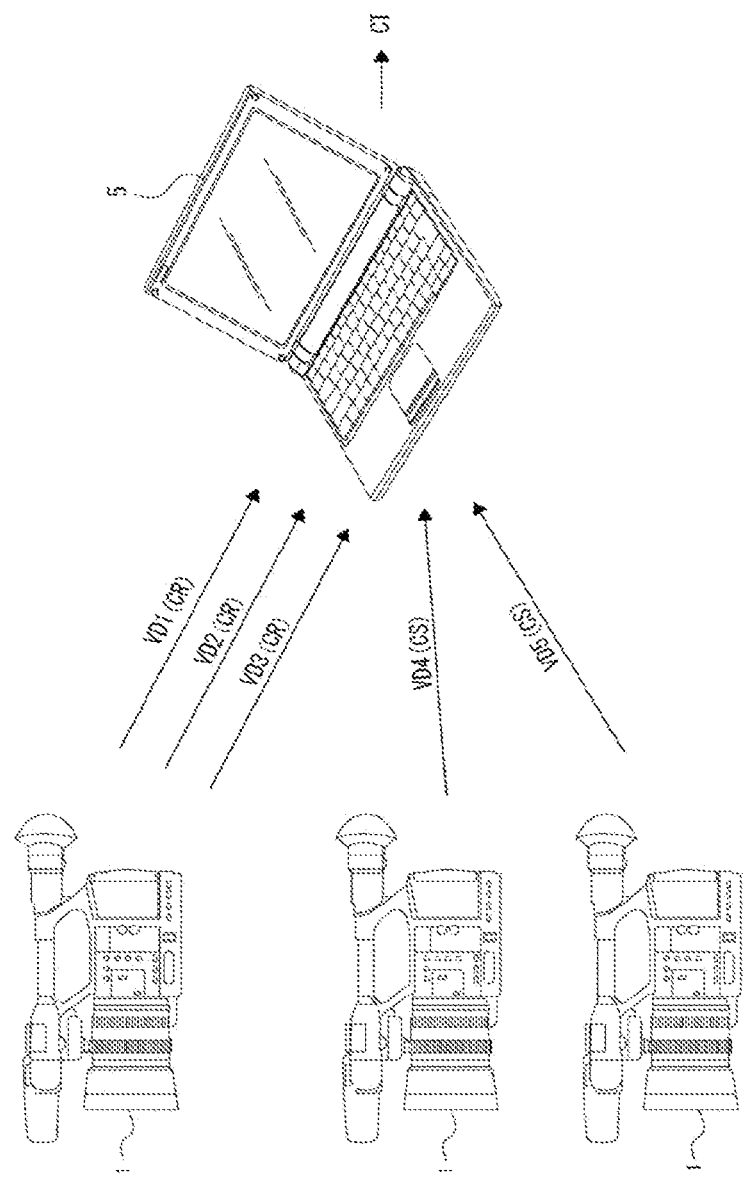
FIG. 3 is a diagram illustrating an example of a configuration of the device that realizes an operation according to the embodiment.
Figure 4:
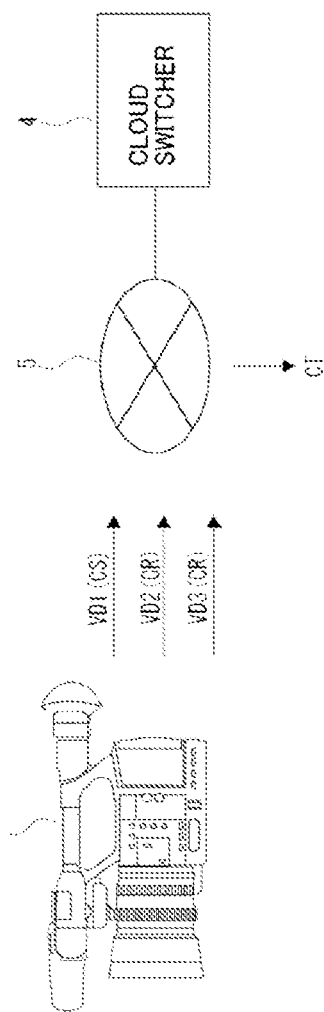
FIG. 4 is a diagram illustrating an example of a configuration of the device that realizes an operation according to the embodiment.

The suffixes "(CS)" and "(CR)" are given similarly in FIGS. 2, 3, and 4.

The portable terminal 2 in FIG. 1 can sequentially select the shots VD1, VD2, VD3, and VD4 supplied from the imaging device 1 through a switching process, generate moving-image content CT, and perform transmission outputting, display outputting, recording, uploading, or the like.

It is assumed that, for example, only the shot VD1 is transmitted from the imaging device 1, and it is also assumed that the shots VD2, VD3, and VD4 are generated from the shot VD1 through a cropping process and then are subjected to a switching process in the portable terminal 2.

FIG. 2 illustrates an example in which the plurality of imaging devices 1 are used and a switcher 3 has a function of an image processing device according to the present technology.

The switcher 3 is a device that performs switching to select an output image (a main image) from input images of a plurality of systems. For example, in general, an operator manually performs a switching operation and is also assumed to perform automatic switching when a function according to the embodiment is provided.

In this example, the shots VD1, VD2, and VD3 are each transmitted from three imaging devices 1 to the switcher 3. Each imaging device 1 outputs an image obtained by imaging an event or the like as one shot.

Each imaging device 1 transmits a moving image as the shots VD to the switcher 3 through wired communication or wireless communication, for example.

The switcher 3 can sequentially switch the shots VD1, VD2, VD3, and VD4 through the switching process, generate the moving-image content CT, and perform transmission outputting, display outputting, recording, uploading, or the like.

FIG. 3 illustrates an example in which a plurality of imaging devices are used and a computer device 5 has a function of an imaging processing device according to the present technology. The computer device 5 is, for example, a personal computer or the like. The above-described portable terminal 2 may also be used.

In this example, the shots VD1, VD2, and VD3 are each transmitted as cropped images from one of the three imaging devices 1. The shots VD4 and VD5 which are images obtained by imaging an event or the like are respectively transmitted from the two remaining imaging devices 1.

Communication between the imaging device 1 and the computer device 5 may be performed as, for example, wired communication or wireless communication (for example, short-range wireless communication or the like).

The computer device 5 can sequentially switch the shots VD1, VD2, VD3, VD4, and VD5 through the switching process, generate the moving-image content CT, and perform transmission outputting, display outputting, recording, uploading, or the like.

FIG. 4 illustrates an example in which a cloud switcher 4 communicating with the imaging device 1 via a network 6 has a function of an image processing device according to the present technology.

The network 6 is assumed to be, for example, any of various kinds of networks such as the Internet, a local area network (LAN), a virtual private network (VPN), an intranet, an extranet, a satellite communication network, a community antenna television (CATV) communication network, a telephone line network, and a mobile communication network.

This example is an example in which the imaging device 1 transmits the shots VD1, VD2, and VD3 as cropped images to the cloud switcher 4 via the network 6. The cloud switcher 4 sequentially switches the shots VD1, VD2, and VD3 through the switching process, generates the moving-image content CT, and transmits and outputs the moving-image content CT via the network 6.

Figure 5:
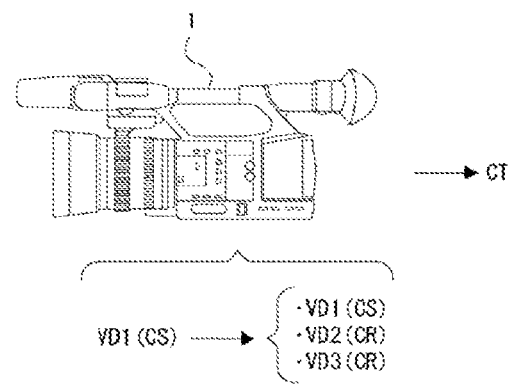
FIG. 5 is a diagram illustrating an example of a configuration of the device that realizes an operation according to the embodiment.

FIG. 5 illustrates an example in which the imaging device 1 has a function of an image processing device according to the present technology.

For example, the imaging device 1 generates a plurality of shots VD (for example, VD1, VD2, and VD3) by performing imaging and performing an internal cropping process. Then, the automatic switching process is performed on the plurality of shots VD1, VD2, and VD3 to generate and output the moving-image content CT.

The examples of the specific devices serving as the image processing device according to the embodiment has been exemplified, but these devices are exemplary and diverse examples of other specific devices can be assumed. In the examples of FIGS. 1, 2, 3, and 4, the combinations of the examples of the shots VD transmitted and output from the imaging device 1, and the portable terminal 2, the switcher 3, the computer device 5, and the cloud switcher 4 corresponding to the image processing device according to the embodiment are illustrated, but the present technology is not limited to these combinations. Since the examples of the output shots and the examples of the devices serving as the image processing device are given, other combinations (not illustrated) can also be assumed.

Hereinafter, for example, examples of a configuration and an operation according to an embodiment will be described assuming the imaging device 1 and the portable terminal 2 illustrated in FIG. 1.

First, a specific exemplify configuration of the imaging device 1 will be described with reference to FIG. 6.

Figure 6:
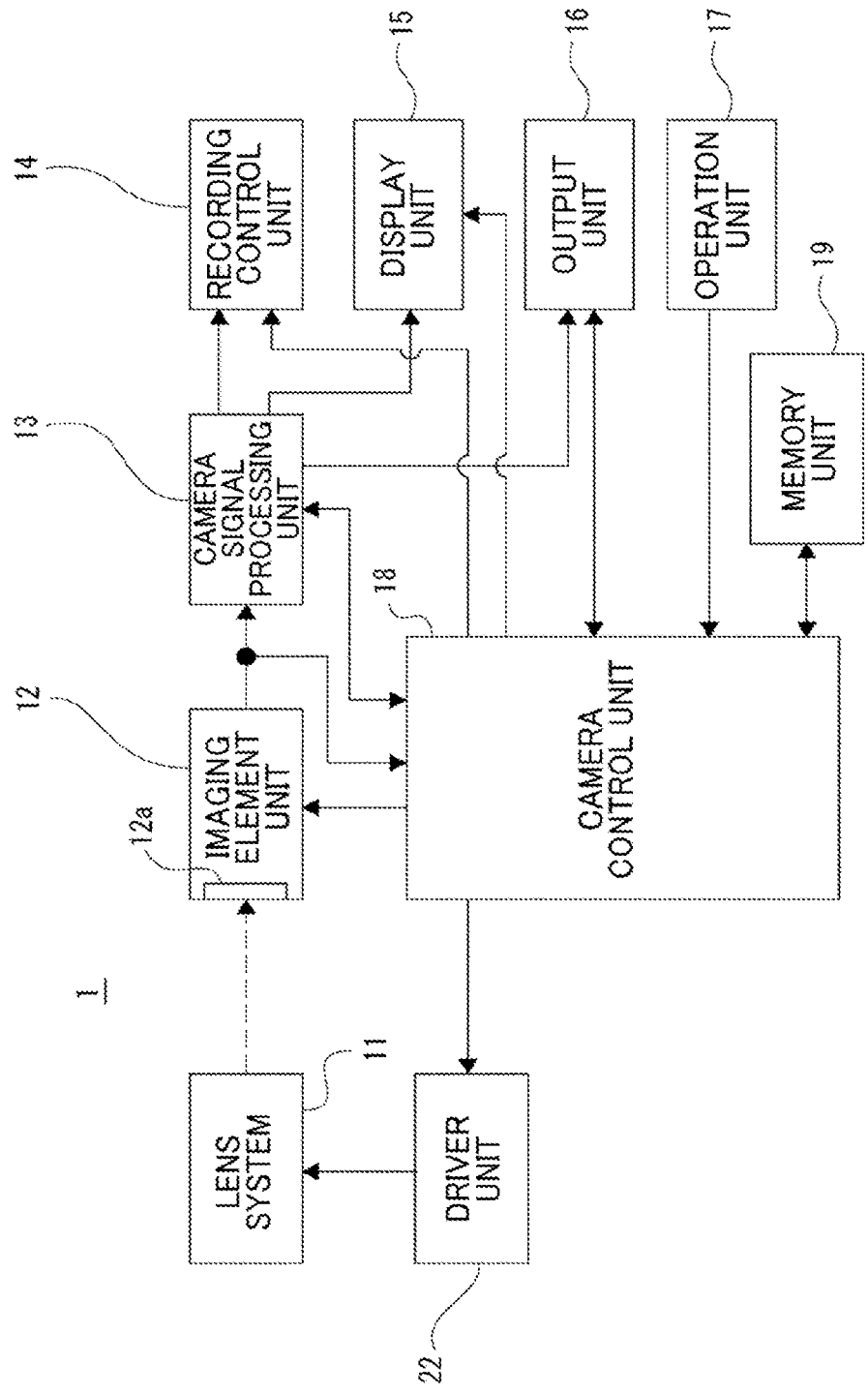
FIG. 6 is a block diagram illustrating an imaging device according to the embodiment.

As illustrated in FIG. 6, the imaging device 1 includes a lens system 11, an imaging element unit 12, a camera signal processing unit 13, a recording control unit 14, a display unit 15, an output unit 16, an operation unit 17, a camera control unit 18, a memory unit 19, and a driver unit 22.

The lens system 11 includes lenses such as a cover lens, a zoom lens, and a focus lens and a diaphragm mechanism. The lens system 11 guides light (incident light) from a subject and condenses the light on the imaging element unit 12.

The imaging element unit 12 includes, for example, a complementary metal oxide semiconductor (CMOS) or charge coupled device (CCD) type image sensor 12a (an imaging element).

The imaging element unit 12 performs, for example, a correlated double sampling (CDS) process, an automatic gain control (AGC) process, or the like on an electrical signal obtained by photoelectrically converting the light received by the image sensor 12a and further performs an analog/digital (A/D) conversion process. Then, an imaging signal is output as digital data to the camera signal processing unit 13 or the camera control unit 18 at the rear stage.

The camera signal processing unit 13 includes, for example, an image processor such as a digital signal processor (DSP). The camera signal processing unit 13 performs various kinds of signal processing on a digital signal (a captured image signal) from the imaging element unit 12. For example, the camera signal processing unit 13 performs preprocessing, a synchronization process, a YC generation process, a resolution conversion process, codec processing, and the like as camera processing.

In the preprocessing, a clamping process of clamping black levels of R, G, and B to predetermined levels, a correction process between color channels of R, G, and B, and the like are performed on the captured image signal from the imaging element unit 12.

In the synchronization process, a color separation process is performed so that image data of pixels have all color components of R, G, and B. For example, in the case of an imaging element in which color filters with Bayer alignment are used, demosaic processing is performed as the color separation process.

In the YC generation process, a luminance (Y) signal and a color (C) signal are generated (separated) from the image data of R, G, and B.

In the resolution conversion process, the resolution conversion process is performed on the image data subjected to various kinds of signal processing.

In the codec processing of the camera signal processing unit 13, for example, an encoding process for recording or communication or file generation are performed on the image data subjected to the foregoing various kinds of processing.

For example, a process for a stream image data to be output as a moving image or generation of an image file for recording the moving image are performed. The camera signal processing unit 13 can also generate stream image data generated from an original captured image through the cutting process.

In FIG. 6, a sound processing system is not illustrated. However, actually, a sound recording system and a sound processing system may be included, and the stream image data or the recording image file may include sound data along with image data serving as a moving image.

The recording control unit 14 performs recording and reproducing in a recording medium configured as, for example, a nonvolatile memory. The recording control unit 14 performs, for example, a process of recording a thumbnail image or an image file such as a moving-image data or still-image data in a recording medium.

A variety of actual forms of the recording control unit 14 can be considered. For example, the recording control unit 14 may be configured as a flash memory and a writing/reading circuit embedded in the imaging device 1 or may be formed as a card recording and reproducing unit that performs recording, reproducing, accessing on a recording medium which is detachably mounted on the imaging device 1, for example, a memory card (a portable flash memory or the like). As the form embedded in the imaging device 1, a hard disk drive (HDD) or the like may be realized.

The display unit 15 is a display unit that performs various kinds of display for an imaging person and is, for example, a viewfinder or a display panel configured by a display device such as a liquid crystal panel (LCD) or an organic electro-luminescence (EL) display disposed in the casing of the imaging device 1.

The display unit 15 displays various kinds of display on a display screen based on an instruction from the camera control unit 18.

For example, the display unit 15 displays a reproduced image of an image data read from a recording medium in the recording control unit 14.

The display unit 15 is supplied with image data of a captured image subjected to the resolution conversion for display by the camera signal processing unit 13, and the display unit 15 performs display based on the image data of the captured image in response to an instruction from the camera control unit 18 in some cases. Thus, a so-called through-image (a monitoring image of a subject) which is a captured image of which a composition is being checked is displayed.

The display unit 15 performs display of various operation menus, icons, messages, and the like, that is, a graphical user interface (GUI), on the screen based on an instruction from the camera control unit 18.

The output unit 16 performs data communication, network communication, or the like with an external device in a wired or wireless manner. For example, captured-image data (for example, a stream image signal which is a moving image) processed by the camera signal processing unit 13 is transmitted and output to an external information processing device, display device, recording device, or reproducing device or the like.

In particular, in the case of the embodiment, the output unit 16 performs a process of transmitting the shots VD as a moving image which is currently being captured to a device such as the portable terminal 2, the switcher 3, the computer device 5, or the cloud switcher 4 exemplified in FIGS. 1, 2, 3, and 4 as a realized example of the image processing device.

The operation unit 17 is a generic input device used for a user to perform various kinds of inputs. Specifically, the operation unit 17 indicates various kinds of operators (keys, a dial, a touch panel, a touch pad, and the like) provided in the casing of the imaging device 1.

The operation unit 17 detects a user operation and a signal in accordance with an input operation is transmitted to the camera control unit 18.

The camera control unit 18 is configured by a microcomputer (an arithmetic processing device) including a central processing unit (CPU).

The memory unit 19 stores information or the like used for a process by the camera control unit 18. The illustrated memory unit 19 overall indicates, for example, a read only memory (ROM), a random access memory (RAM), a flash memory, and the like The memory unit 19 may be a memory region embedded in a microcomputer chip serving as the camera control unit 18 or may be configured by a separate memory chip.

The camera control unit 18 controls the entire imaging device 1 by executing a program stored in the ROM, the flash memory, or the like of the memory unit 19. For example, the camera control unit 18 controls an operation of each necessary unit with regard to control of a shutter speed of the imaging element unit 12, instructions of various kinds of signal processing in the camera signal processing unit 13, an imaging operation or a recording operation in response to an operation by the user, a reproducing operation of a recorded image file, operations of the lens system 11 such as zoom, focus, diaphragm adjustment in a lens barrel, and a user interface operation.

The RAM of the memory unit 19 is used to temporarily store data, a program, or the like as a working area used for the CPU of the camera control unit 18 to process various kinds of data.

The ROM or the flash memory (nonvolatile memory) of the memory unit 19 is used to store application programs for various operations, firmware, and the like in addition to an operating system (OS) used for the CPU to control each unit and a content file such as an image file.

The driver unit 22 includes, for example, a motor driver for a zoom lens driving motor, a motor driver for a focus lens driving motor, and a motor driver for a motor of a diaphragm mechanism.

The motor drivers apply driving currents to corresponding drivers in response to instructions from the camera control unit 18 to perform movement of the focus lens, the zoom lens, opening and closing of diaphragm blades of the diaphragm mechanism, and the like.

Figure 7:
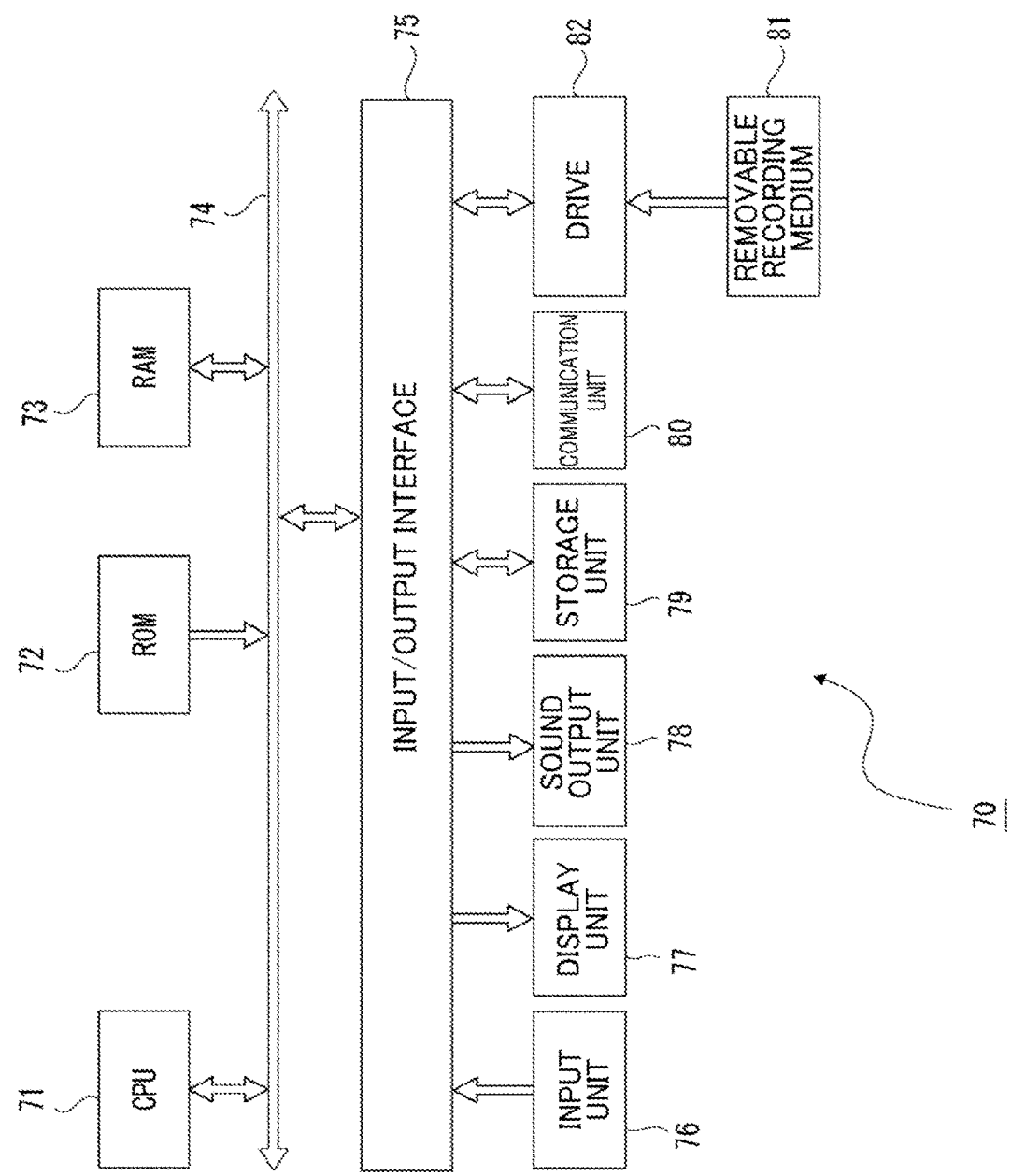
FIG. 7 is a block diagram illustrating an information processing device according to the embodiment.

Next, a configuration of an information processing device 70 functioning as an image processing device according to the embodiment is illustrated in FIG. 7. For example, the portable terminal 2 or the computer device 5 is configured as the information processing device 70. The switcher 3, the cloud switcher 4, and the like that have the same configuration as the information processing device 70 can function as the image processing device according to the embodiment.

In FIG. 7, a CPU 71 of the information processing device 70 performs various processes in accordance with programs stored in a ROM 72 or programs loaded from the storage unit 79 to a RAM 73. The RAM 73 appropriately stores not only data used for the CPU 71 to perform various processes but also necessary data or the like.

The CPU 71, the ROM 72, the RAM 73 are connected to each other via a bus 74. An input/output interface 75 is also connected to the bus 74.

An input unit 76 formed by an operator or an operation device is connected to the input/output interface 75.

For example, as the input unit 76, any of various operators or operation devices such as a keyboard, a mouse, a key, a dial, a touch panel, a touch pad, and a remote controller is assumed.

A user operation is detected by the input unit 76 and a signal in accordance with an input operation is analyzed by the CPU 71.

A display unit 77 formed by an LCD or an organic EL panel and a sound output unit 78 formed by a speaker or the like are connected integrally or separately to the input/output interface 75.

The display unit 77 is a display unit that performs various kinds of display and is, for example, a display device provided on the casing of the information processing device 70 or a separate display device connected to the information processing device 70.

The display unit 77 displays an image for various kinds of image processing, a processing target moving image, or the like on a display screen in response to an instruction from the CPU 71. The display unit 77 displays various operation menus, icons, and messages, that is, a graphical user interface (GUI) in response to an instruction from the CPU 71.

A storage unit 79 configured by a hard disk, a solid-state memory, or the like or a communication unit 80 configured by a modem or the like are connected to the input/output interface 75 in some cases.

The communication unit 80 performs a communication process via a transmission path such as the Internet or performs communication such as wired/wireless communication or bus communication with various devices.

A drive 82 is connected to the input/output interface 75 as necessary so that a removable recording medium 81 such as a magnetic disk, an optical disc, a magneto-optical disc, or a semiconductor memory is appropriately mounted. The drive 82 can read a data file such as an image file or various computer programs from the removable recording medium 81. The read data file is stored in the storage unit 79 or an image or a sound included in the data file is output to the display unit 77 or the sound output unit 78. A computer program or the like read from the removable recording medium 81 is installed to the storage unit 79 as necessary.

In the information processing device 70, for example, software for a process of the image processing device according to the present disclosure can be installed through network communication of the communication unit 80 or via the removable recording medium 81. Alternatively, the software may be stored in advance in the ROM 72, the storage unit 79, or the like.

2. Example of Functional Configuration of Image Processing Device

Figure 8:
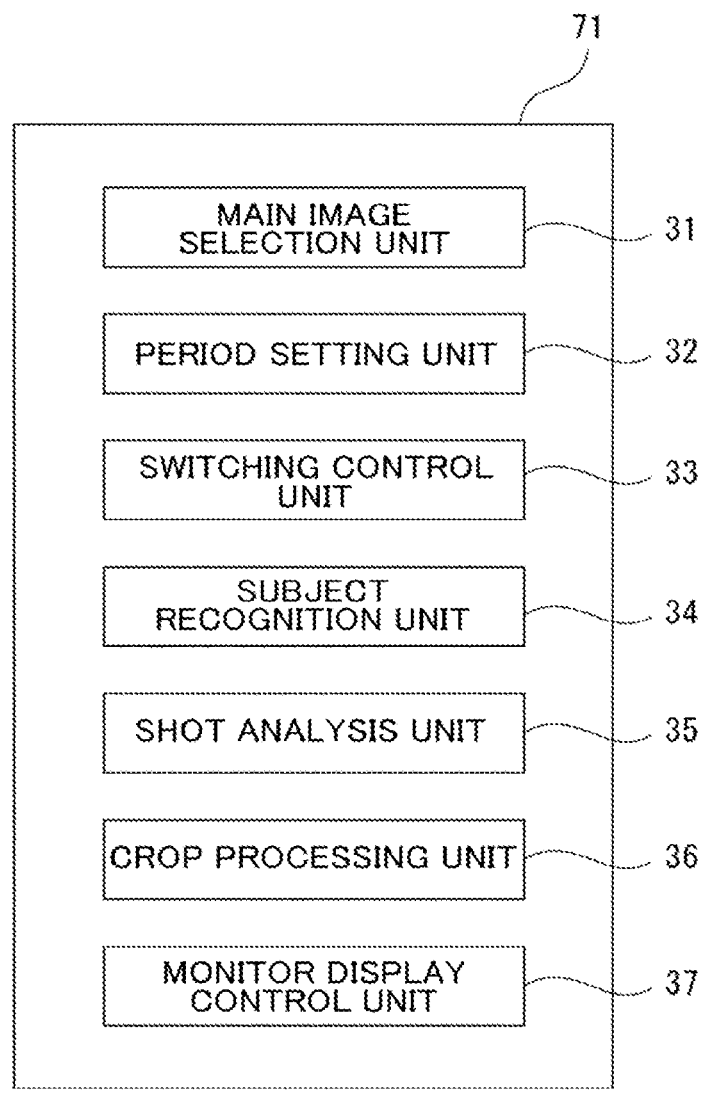
FIG. 8 is a diagram illustrating a functional configuration of an image processing device according to the embodiment.

The image processing device according to the embodiment is realized, for example, by causing the CPU 71 of the information processing device 70 to have a functional configuration of FIG. 8 in accordance with software (an application program).

That is, the information processing device 70 (or the CPU 71) includes at least a main image selection unit 31 and a period setting unit 32 and functions as the image processing device according to the embodiment.

The information processing device 70 (or the CPU 71) further includes a switching control unit 33 in some cases.

Further, the information processing device 70 (or the CPU 71) includes some or all of a subject recognition unit 34, a shot analysis unit 35, a crop processing unit 36, and a monitor display control unit 37 in some cases.

For example, the portable terminal 2 in FIG. 1 and the computer device 5 in FIG. 3 have the configuration of the information processing device 70 in FIG. 7 and the CPU 71 has the functional configuration in FIG. 8 to function as the image processing device according to the embodiment.

The switcher 3 in FIG. 2 and the cloud switcher 4 in FIG. 4 have the configuration corresponding to FIG. 7 (or at least configuration corresponding to the CPU 71) and the CPU 71 has the functional configuration in FIG. 8 to function as the image processing device according to the embodiment.

When the imaging device 1 functions as the image processing device as in FIG. 5, for example, the camera signal processing unit 13 in FIG. 6 or the camera control unit 18 has the functional configuration in FIG. 8 to function as the image processing device according to the embodiment.

For example, the image processing device according to the embodiment which is realized in this way is, for example, a device that automatically switches and outputs the plurality of shots VD obtained by the single imaging device 1 or the plurality of imaging devices 1. For example, when moving-image content which is a live video is broadcast, delivered, or recorded, one of the plurality of shots VD is sequentially selected as a main image and the shot VD is switched and output in accordance with the selection. A video stream formed by the plurality of sequentially switched shots VD configures, for example, the moving-image content CT which is a live video.

In this case, the image processing device according to the embodiment can produce moving-image content with higher quality by performing "generation of a switching timing" for a content purpose, a production aim, or non-boring of a viewer or "switching of an output image (selection of a main image)" in content.

The main image selection unit 31 illustrated in FIG. 8 is a function of selecting one image serving as a main image from the plurality of shots VD.

That is, a process of selecting an appropriate shot as a subsequent shot VD to be used in the moving-image content is performed.

The period setting unit 32 is a function of setting a continuous period length for which the shot VD selected by the main image selection unit 31 is continued as a main image in accordance with an image classification to which the selected shot VD corresponds among the plurality of image classifications.

Here, the continuous period length is a length of a period (a time length) in which one shot VD selected by the main image selection unit 31 is switched to the main image and then the main image is switched to another shot VD subsequently selected by the main image selection unit 31.

That is, the period setting unit 32 sets the continuous period length for each shot VD selected as the main image.

The switching control unit 33 is a function of switching the main image in accordance with the continuous period length set by the period setting unit 32. That is, control performed on a switching operation of continuing the shot VD serving as the main image for a time indicated by the continuous period length set for that shot VD as the main image and then switching the shot VD to the subsequent shot VD.

The switching control unit 33 also determines a switching timing of the main image. For example, the switching control unit 33 determines a switching timing when the current main image reaches the continuous period length.

The switching control unit 33 monitors an image classification PD of each shot VD and determines the switching timing in accordance with, for example, a change or the like of the image classification of the shot VD serving as the current main image.

The switching control unit 33 determines the switching timing in response to a user operation in some cases.

The subject recognition unit 34 is a function of performing a process such as image analysis on an image of the shot VD and recognizing a subject in the shot VD.

For example, a process of detecting and tracking a subject is performed through face detection, person detection, posture estimation, and the like in some cases. A process of performing face identification (personal identification) to recognize who the subject is (whether the subject is a main subject such as a main member) is performed in some cases.

A process of detecting a speaker from a motion of a mouth detected through face part detection is performed in some cases. The process of the subject recognition unit 34 may not necessarily be performed in the image processing device.

The subject recognition unit 34 performs a subject recognition process to determine a region to be cropped in some cases.

The shot analysis unit 35 is a function of extracting shot information from a recognition result by the subject recognition unit 34 and determining the image classification of the shot VD.

The shot information is assumed to information indicating who is shown or information regarding a composition (disposition), an imaging technology, or the like.

A target of the information regarding a subject who is shown is, for example, a subject who is largely shown in an image.

The information regarding a composition (disposition) is information regarding distinction of an overlook shot, a faraway shot (a full shot or a knee shot), a close shot (a waist shot, a bust shot, or a close-up shot) or information regarding to which type of composition or subject disposition, such as a composition of the national flag of Japan or the rule of thirds, the shot VD corresponds. The distinction of a subject size or the like in the image of the shot VD is also included in the information regarding the composition.

The information regarding the imaging technology is information indicating an imaging technology itself such as fixing, following, panning, zooming, or dolly.

Based on the shot information, the shot analysis unit 35 classifies all the shots VD into a main subject shot (a main shot/speaker shot), a support shot, and a whole shot (a shot of a large number of people or a front position).

It is conceivable that the determination of the image classification based on the shot information is performed based on machine learning.

The whole shot may be determined under a condition such as an image at a most front position, a faraway image, an image in which the number of subject people is the largest or may be specified based on destination of the user. For example, when the imaging device 1 performing imaging in a faraway distance in the front position of a subject is disposed, it is conceivable that the shot VD by the imaging device 1 is normally assumed to be a whole shot and is set by the user.

The process of the subject recognition unit 34 may not necessarily be performed in the image processing device.

Figure 9:
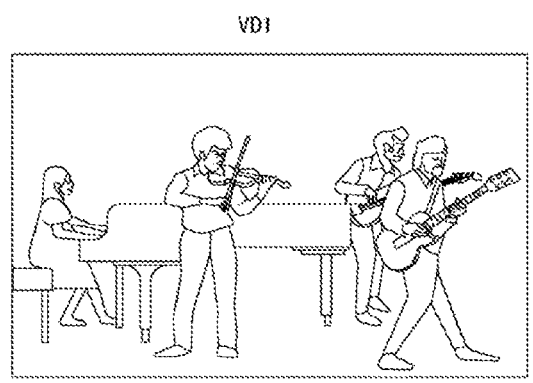
FIG. 9 is a diagram illustrating a whole shot, a main shot, and a support shot according to the embodiment.
Figure 9:
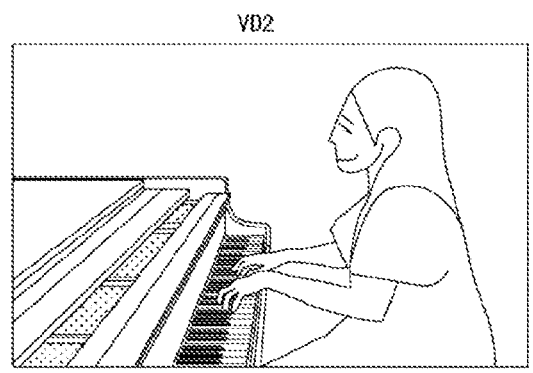
Figure 9:
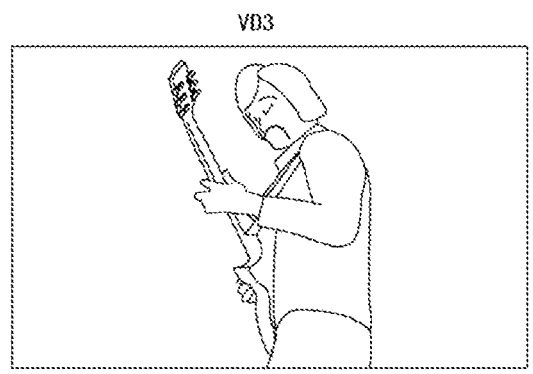

FIG. 9 illustrates examples of image classifications of the shots VD. In FIG. 9, image details from certain time points are exemplified as the shots VD1, VD2, and VD3. The shots VD1, VD2, and VD3 are assumed to be the shots VD imaged by, for example, three imaging devices 1.

For example, the shot VD1 is a shot obtained by imaging the whole in a "faraway" distance at the front position of a live stage and corresponds to the "whole shot".

The shot VD2 is a shot obtained by imaging a pianist "closely" from the imaging device 1 in the back of the pianist on the stage.

When a main musician of the live event is the pianist of the shot VD2, the shot VD including the pianist is determined to be a "main shot" or a "main subject shot" based on, for example, face identification or personal recognition. For example, by learning the face or the like of a main member in advance, it is possible to determine the shot VD obtained by imaging a specific person as a main shot.

The shot VD3 is a shot obtained by imaging a guitarist closely from the imaging device 1 on the side of the stage. Since this is a shot of a subject who is not a main member, the shot is determined to be a "support shot".

The crop processing unit 36 performs a process of cutting a partial region from one captured image and generating one shot VD. For example, a process of cutting each subject person from the entire image in which four persons are shown and generating the shots VD as four cropped images is performed. The process of the crop processing unit 36 may not necessarily be performed in the image processing device.

Figure 10:
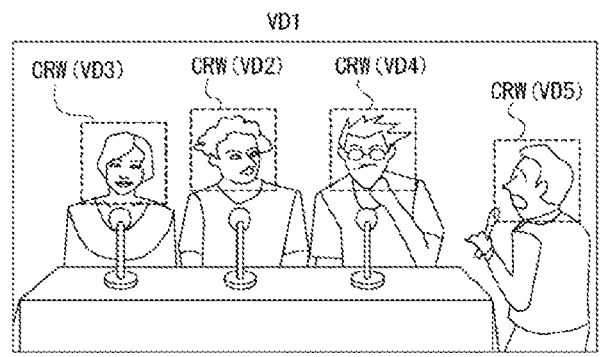
FIG. 10 is a diagram illustrating a whole shot, a speaker shot, and a support shot according to the embodiment.
Figure 10:
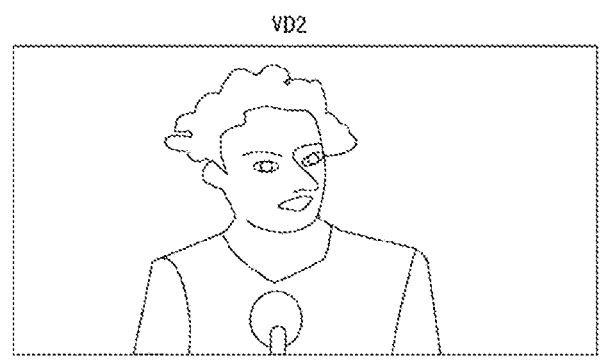
Figure 10:
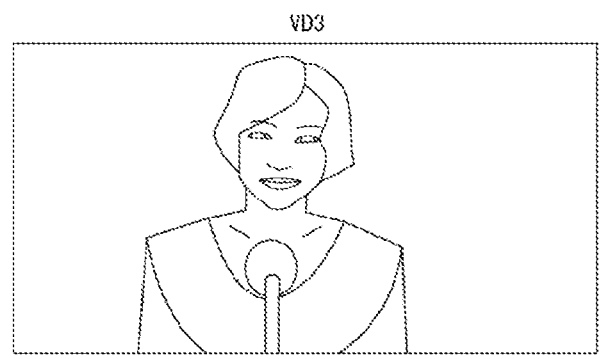

FIG. 10 illustrates examples of images obtained by causing one imaging device 1 to image scenes of an interview and performing broadcasting or the like.

In this case, the shot VD1 is an image obtained by causing the imaging device 1 to image the whole in the front of the interview scene.

In the images, for example, four regions indicated by cropping regions CRW are cropped and become the shots VD2, VD3, VD4, and VD5.

The crop processing unit 36 is a function of performing a process of cutting a part of one image in this way and generating a cropped image.

The image classification of the shot analysis unit 35 in the case of FIG. 10 will be described.

The shot VD1 in FIG. 10 is a whole shot imaged in a faraway distance in the front position of the interview scene and corresponds to the "whole shot".

The shot VD2 is an image obtained by cutting one person among the interviewed persons and a person shown in this image is a person who is talking at this time point. For example, when the person is determined to be a person who is talking by a motion or the like of a mouth detected from the image, the shot VD2 is determined to be a "speaker shot" or a "main subject shot" at the current time point. The shot VD determined to be the speaker shot is changed whenever the speaker is changed.

Since the shot VD3 is a shot of a person other than the speaker, the shot VD3 is determined to be a "support shot" at this time point. Subsequently, in the scene in which the person is talking, the shot VD3 is determined to be a "speaker shot" or a "main subject shot".

The monitor display control unit 37 in FIG. 8 is a function of performing control such that, for example, a monitor screen of a switching operation is displayed on the display unit 77 or the like.

Figure 11:
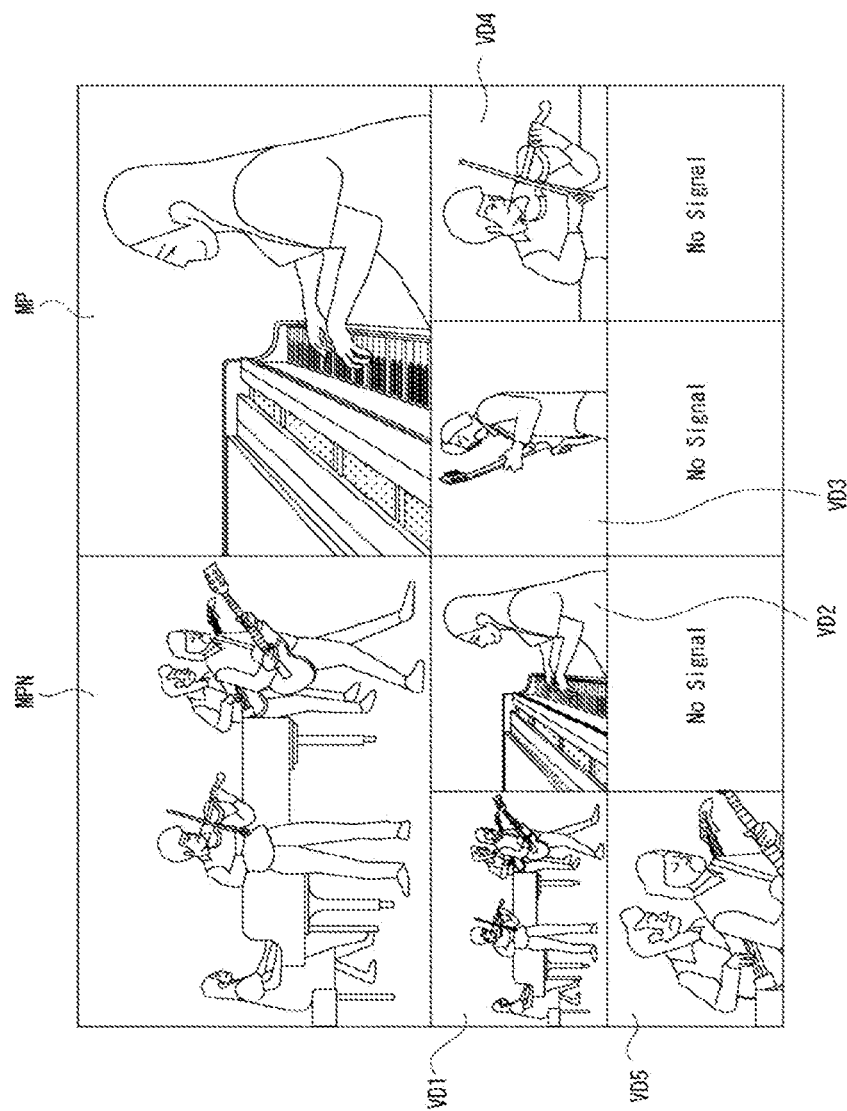
FIG. 11 is a diagram illustrating a monitor screen according to the embodiment.

FIG. 11 illustrates an example of the monitor screen.

On the monitor screen, for example, it is assumed that a screen is divided into a plurality of regions to display necessary images.

For example, on the upper right of the screen, the shot VD output as a main image MP is displayed.

In the lower part of the screen, the plurality of shots VD1, VD2, VD3, and the like input as switching targets are displayed in relatively smaller regions.

On the upper left of the screen illustrated in the drawing, the shot VD scheduled to be output as the subsequent main image MP (a subsequent image MPN) may be displayed. For example, a user (operator) manually displays the shot VD scheduled as a subsequent main screen. Thus, the user can measure a timing of the manual switching.

The user can check a situation of the switching operation on the monitor screen. Upon automatic switching, the temporary manual switching may also be able to be performed.

The exemplary screen of FIG. 11 is merely exemplary and the configuration of the monitor screen or display details are not limited thereto.

Figure 12:
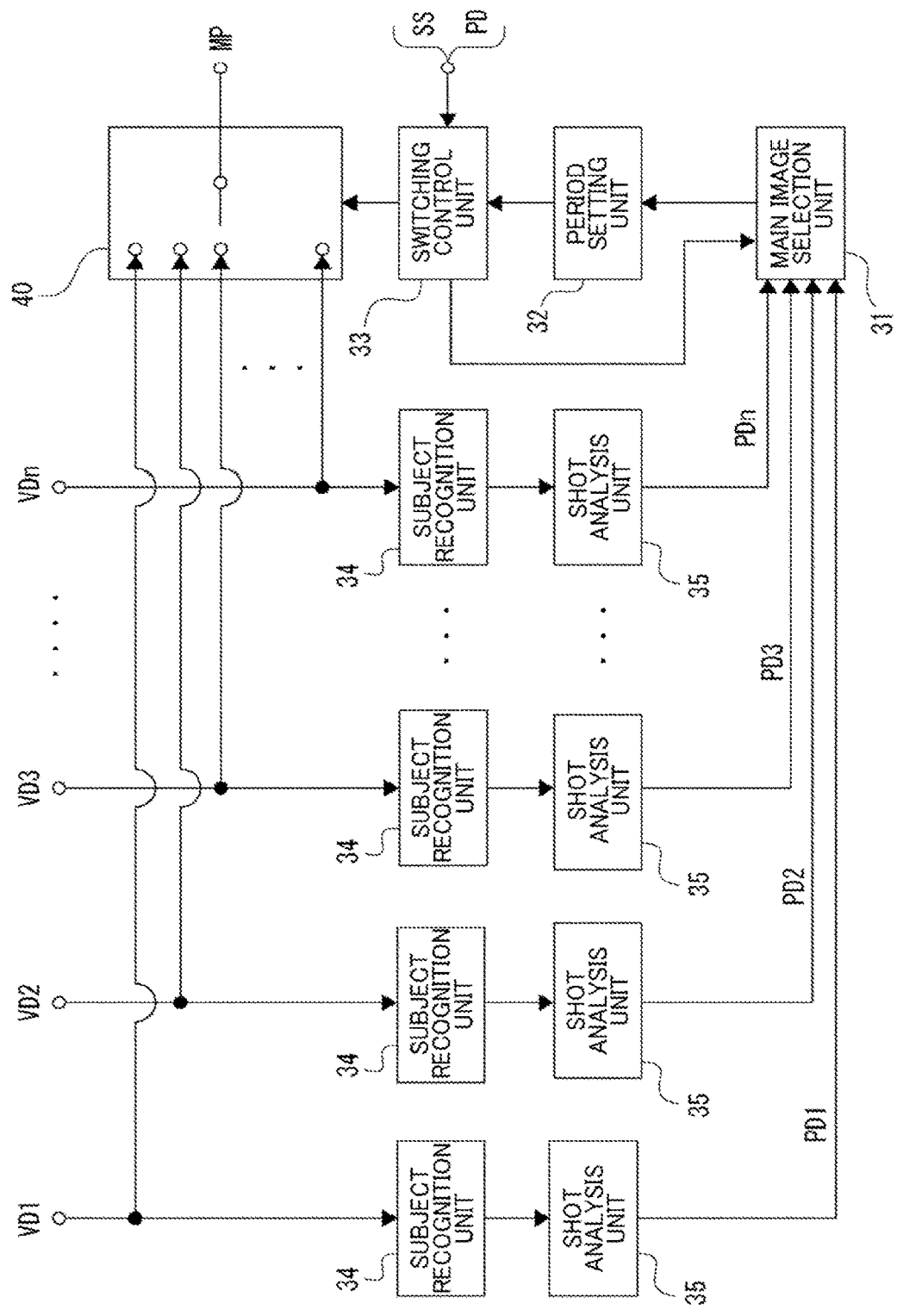
FIG. 12 is a diagram illustrating a process of the image processing device on each shot of the captured images of a plurality of imaging devices according to the embodiment.

An example of a flow of a process of the image processing device in accordance with the foregoing function of FIG. 8 will be described with reference to FIG. 12. In FIG. 12, n shots VD (VD1, VD2, . . . , and VDn) are assumed to be input to the image processing device. The case in which n shots VD are input to the image processing device is a case in which the plurality of shots VD are input from one imaging device 1 or the plurality of imaging devices 1 as in FIGS. 1, 2, 3, and 4.

For each shot VD, a process of recognizing a subject in the shot is performed by the subject recognition unit 34.

The shot analysis unit 35 determines the image classification of each shot VD based on a subject recognition result.

The image classifications PD (PD1, PD2, . . . , and PDn) of the shots VD are supplied to the main image selection unit 31 (the term "image classification PD" is used when the image classifications of the plurality of shots VD are generally named).

The main image selection unit 31 selects the shot VD serving as the subsequent main image MP based on the image classifications PD1, PD2, . . . , and PDn of the shots VD. A specific example of the process of selecting the shot will be described later.

The period setting unit 32 sets a continuous period length in the shot VD selected as the subsequent main image MP by the main image selection unit 31 based on the classification information PD.

The n shots VD (VD1, VD2, . . . , and VDn) are supplied by the switching unit 40 to be switched. That is, the switching unit 40 selects one of the shots VD1, VD2, . . . , and VDn and outputs the selected shot as the main image MP at the current time point.

The switching control unit 33 determines a switching timing through the switching determination process and controls the switching operation of the switching unit 40 at the switching timing.

The switching control unit 33 performs control of the switching unit 40 such that the shot VD selected by the main image selection unit 31 is output as the main image MP for the continuous period length set by the period setting unit 32.

The switching control unit 33 also performs the process of the main image selection unit 31 at the switching timing for such switching control. For example, it is monitored whether the continuous time of the current main image MP reaches a continuous period length Tx set by the period setting unit, and the process of the main image selection unit 31 or the period setting unit 32 is performed in accordance with the monitoring.

The switching control unit 33 can perform not only the switching control based on the process of the main image selection unit 31 or the period setting unit 32 but also, for example, interrupted switching control through a user operation. For example, the switching control unit 33 can control the switching unit 40 such that the shot VD instructed by the user is immediately output as the main image MP in accordance with a manual input of operation information SS by the user. Alternatively, the switching control unit 33 can control the switching unit 40 so that the shot VD corresponding to the designated image classification is output immediately as the main image MP in accordance with destination of the image classification PD by the user.

Further, the switching control unit 33 monitors the image classification PD determined by the shot analysis unit 35 on each current shot VD and determines the switching timing in accordance with, for example, a change in the image classification of the shot VD serving as the current main image MP, the image classification of another shot VD, or the like.

Figure 13:
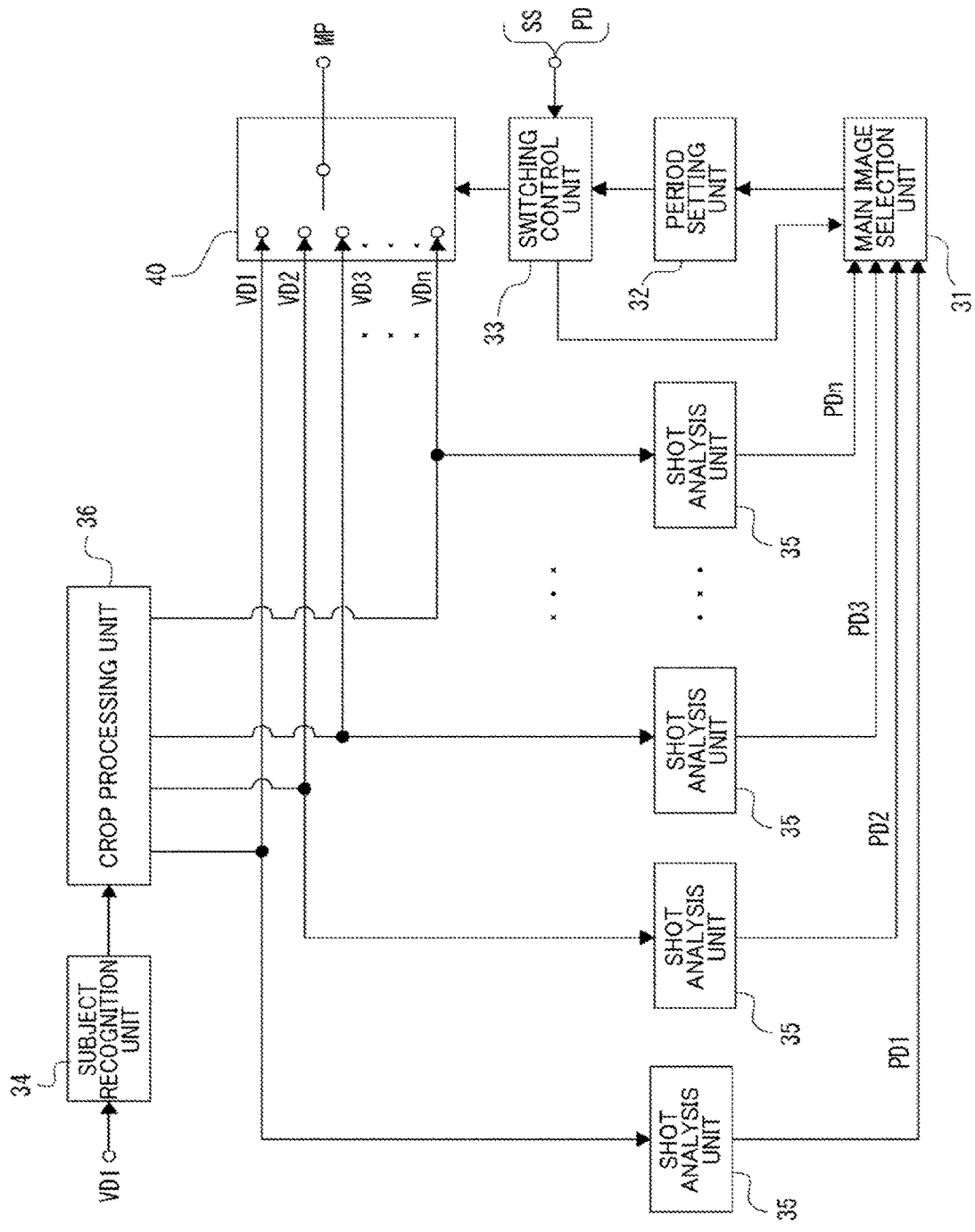
FIG. 13 is a diagram illustrating a process of the image processing device on a shot which is a cropped image from one imaging device according to the embodiment.

Another example of the flow of the process of the image processing device in accordance with the foregoing same function of FIG. 8 will be described with reference to FIG. 13. FIG. 13 illustrates an example in which the function of the crop processing unit 36 is applied.

For example, a case in which switching is performed in the imaging device 1 in FIG. 5 is a case in which a cropping process is performed internally or a case in which the image processing device further crops some of the shots supplied from the imaging device 1 as in FIGS. 1, 2, 3, and 4 to increase the number of shots.

For example, it is assumed that the shot VD1 from one imaging device 1 is supplied to the image processing device.

The subject recognition unit 34 performs a subject recognition process on the shot VD1. In this case, the subject recognition process includes a process of determining a region to be cropped. For example, it is assumed that a face region of a subject person, a region of the whole body, a region of a bust-up region, or the like is determined.

The crop processing unit 36 performs a process of cutting an appropriate region from each frame using a recognition result of the subject recognition unit 34. The cut images are, for example, the shots VD2, . . . , and VDn.

The shot analysis unit 35 determines the image classification of each of the shot VD1 which is a whole image of a cropping source and the shots VD2, . . . , and VDn which are cropped images.

The image classifications PD (PD1, PD2, . . . , and PDn) of the shots VD are supplied to the main image selection unit 31.

The main image selection unit 31 selects the shot VD serving as a subsequent main image MP based on the image classifications PD1, PD2, . . . , and PDn of the shots VD.

The period setting unit 32 sets the continuous period length of the shot VD selected as the subsequent main image MP by the main image selection unit 31 based on the classification information PD.

The n shots VD (VD1, VD2, . . . , and VDn) are supplied to the switching unit 40 to be switched.

The switching control unit 33 performs switching control based on the processes of the main image selection unit 31 and the period setting unit 32 as in the case of FIG. 12 or switching control in accordance with a user operation.

In FIG. 12, a flow of an integrated process of FIGS. 12 and 13, such as the shots VD obtained by cropping some of the shots VD (for example, the shots VD1 and VD2) as described in FIG. 13, is also assumed.

3. Automatic Control of Shot Switching

Meaning of the automatic switching control performed by the image processing device according to the embodiment, as described above, will be described.

Figure 14:
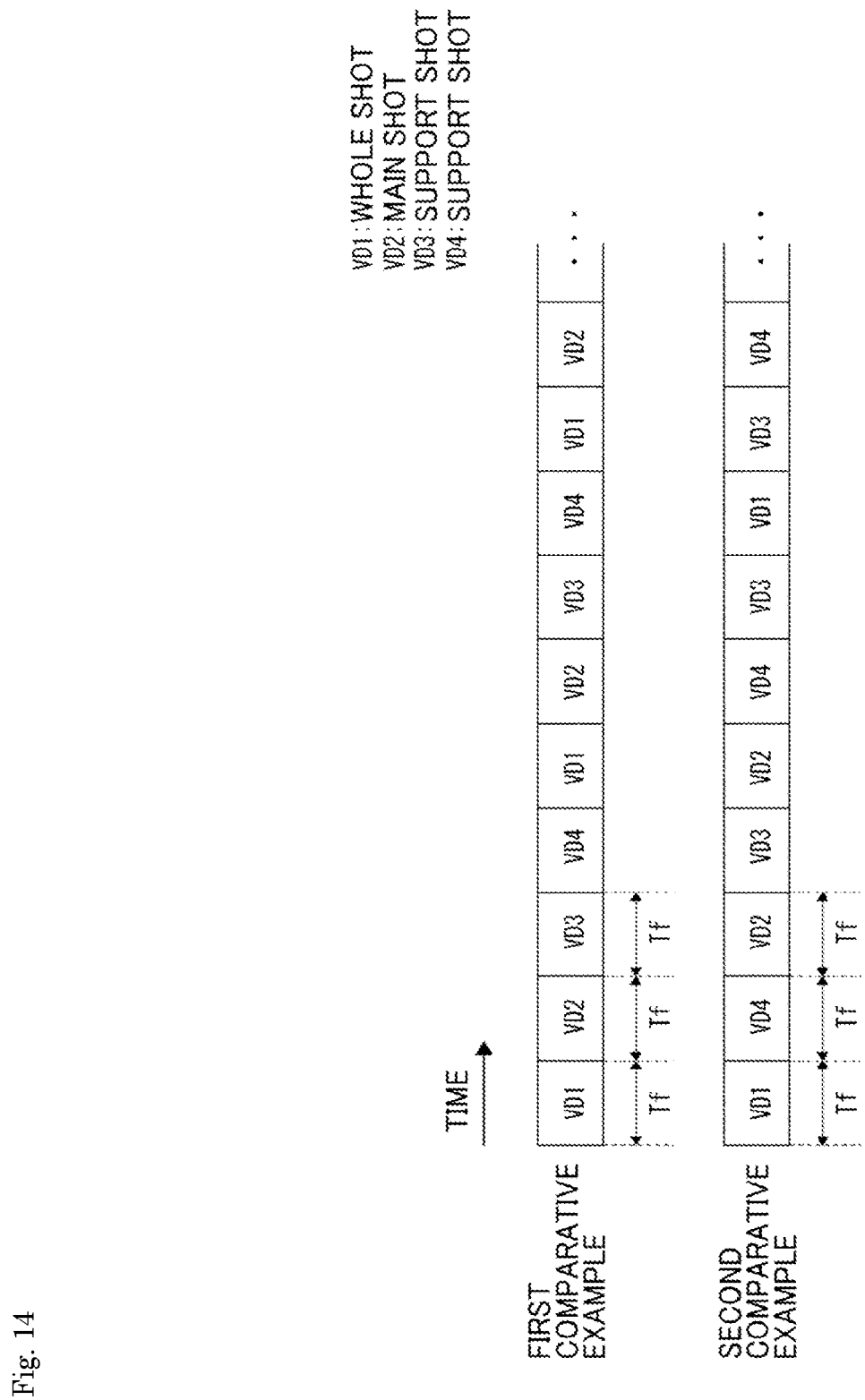
FIG. 14 is a diagram illustrating a shot switching operation according to a comparative example.

First, first and second comparative examples of FIG. 14 indicate exemplary switching operations when the embodiment is not used. The horizontal direction of the drawing represents a time axis and indicates a state in which the shots VD1, VD2, VD3, and VD4 are switched in sequence and output as the main image MP on the time axis as one piece of moving-image content.

Figure 15:
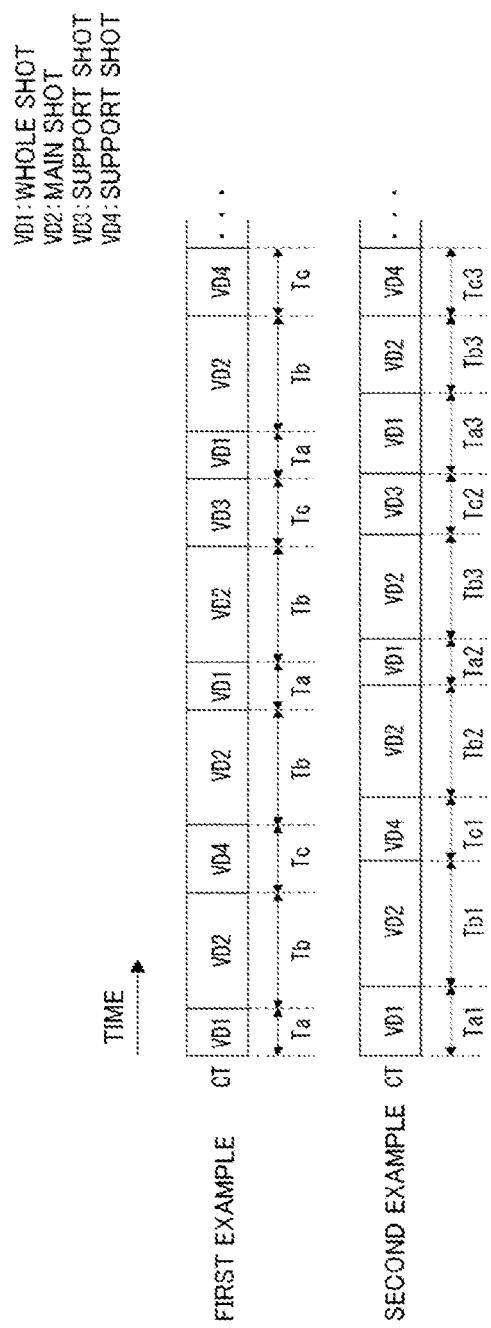
FIG. 15 is a diagram illustrating a shot switching operation according to the embodiment.

In FIGS. 14 and 15 to be described below, to facilitate description, it is assumed that the shot VD1 is normally a whole image, the shot VD2 is normally a main shot, and the shots VD3 and VD4 are normally support shots.

Since the image classification of each shot VD is fixed in some cases depending on an imaging technology or a cropping process, description will be made assuming such a situation. Of course, the present technology is not limited to the image classification of each shot VD which is normally fixed.

The first comparative example is an example in which each shot VD is selected regularly in sequence. The continuous period length for which one shot VD is output as the main image MP is fixed to a time Tf.

As a simple process of automatic switching, it is conceivable that each shot VD is output in sequence at each time Tf in this way and moving-image content in which each shot VD is effectively used can be produced through such a process. The moving-image content can be produced as substantial content by switching various angle images, up-images of each subject person, and the like rather than continuously capturing only one whole image. However, when images are normally switched periodically in a specific order, a viewer may feel that a moving image is boring.

The second comparative example is an example in which a selection order of the shots VD is random. By causing the selection order to be random, it is possible to slightly reduce the boring feeling of the viewer.

Since the continuous period length of each output shot VD is the fixed time Tf, the viewer may feel that the content is boring in the end.

This is because the timing of the shot switching is periodic and a tendency for the viewer to feel tension or dynamics of the moving image gradually disappears. Further, when the shot VD is selected at random, it is difficult to reflect an intention to produce the moving-image content in some cases. For example, when moving-image content in which a certain musician is featured as a main member is desired to be produced in random selection, a moving image in which only support member is shown or the main and support members are almost equally displayed may be produced in some cases.

Accordingly, in the embodiment, the intention to produce the moving image is reflected in view of such circumstances and the automatic switching process in which it is possible to easily realize the moving-image content CT which the viewer rarely feels bored about is realized through the above-described process of FIG. 12 or 13.

First and second examples of the moving-image content CT realized in the switching operation according to the embodiment are illustrated in FIG. 15.

The first example is an example in which the continuous period length differs in accordance with the image classification.

That is, the continuous period lengths of the whole shot, the main shot, and the support shot are a time Ta, a time Tb, and a time Tc, respectively. In this example, Tb>Tc>Ta is satisfied. Tb>Ta>Tc may be satisfied. That is, the continuous period length of the main shot is set to be long. The continuous period length of one of the support shot and the whole shot is set to be the shortest.

For example, the continuous period lengths of the main shot, the support shot, and the whole shot are set to 8 seconds, 6 seconds, and 4 seconds, respectively.

Then, the shot VD selected by the main image selection unit 31 is output in sequence as the main image MP at each continuous period length set in accordance with the image classification PD of the shot VD.

That is, the shot VD is switched in sequence in such a manner that the shot VD1 first continues for only the time Ta, the shot VD2 subsequently continues for only the time Tb, and the shot VD4 subsequently continues for only the time Tc.

The selection by the main image selection unit 31 is neither sequential nor completely random. A predetermined selection rule to be described below is reflected and the shot VD to be output as the subsequent main image MP is selected.

In this way, the moving-image content CT which the viewer rarely feels bored about at the switching timing which is not fixed and in the switching in accordance with the intention to produce the moving image can be easily realized through the automatic switching.

In particular, by causing the main shot to be easily selected as the main image MP by the selection rule or causing the continuous period length to be long, it is possible to realize a moving image in which the main member subject can be sufficiently featured and a scene is switched so that the viewer can feel good meaning tension.

The second example is an example in which moving-image content with more dynamics is realized by further changing the switching timing (in other words, the continuous period length of the main image MP).

That is, the second example is an example in which the continuous period lengths of the whole shot, the main shot, and the support shot are set to the time Ta, the time Tb, and the time Tc, respectively, and Tb>Tc>Ta or Tb>Ta>Tc is set as in the first example and the continuous period time of each image classification has a width.

For example, the continuous period length of the main shot is varied to a time Tb1, Tb2, Tb3, or the like. Similarly, the continuous period length of the support shot is set to a time Tc1, Tc2, Tc3, or the like and the continuous period length of the whole shot is set to a time Ta1, Ta2, Ta3, or the like.

For example, the continuous period length of the whole shot is in the range of 3.5 seconds to 4 seconds, the continuous period length of the support shot is in the range of 4 seconds to 6 seconds, and the continuous period length of the main shot is in the range of 6 seconds to 8 seconds.

For example, for the continuous period length of the main shot, the times Tb1, Tb2, and Tb3 are set at random between 6 seconds and 8 seconds. The same applies to the support shot and the whole shot.

Thus, the periodicity of the switching timing of the shot VD is thinner, and thus it is easy to produce a moving image with tension.

The relation of Tb>Tc>Ta or Tb>Ta>Tc may not necessarily be observed normally. For example, the whole shot may be set to partially overlap in the range of 3 seconds and 5 seconds, the support shot may be set to partially overlap in the range of 4 seconds and 6 seconds, and the main shot may be set to partially overlap in the range of 5 seconds and 8 seconds.

4. Example of Process According to First Embodiment

For example, exemplary processes of the image processing device performing the switching operations in the foregoing first and second examples according to the first embodiment will be described with reference to FIGS. 16, 17, and 18.

Each process is assumed to be performed by, for example, the CPU 71 in FIG. 7 that has the function in FIG. 8 in description. That is, the image processing device is realized as the portable terminal 2, the computer device 5, the switcher 3, or the cloud switcher 4 as in FIGS. 1, 2, 3, and 4 as an example. When the imaging processing device according to the embodiment is embedded in the imaging device 1 as in FIG. 5, it is conceivable that the following process may be performed by the camera signal processing unit 13 or the camera control unit 18 in FIG. 6.

In the following process is performed on the assumption that there is a plurality of shots VD. As described in FIG. 13, the cropping process is separately performed to obtain the plurality of shots VD in some cases.

Figure 16:
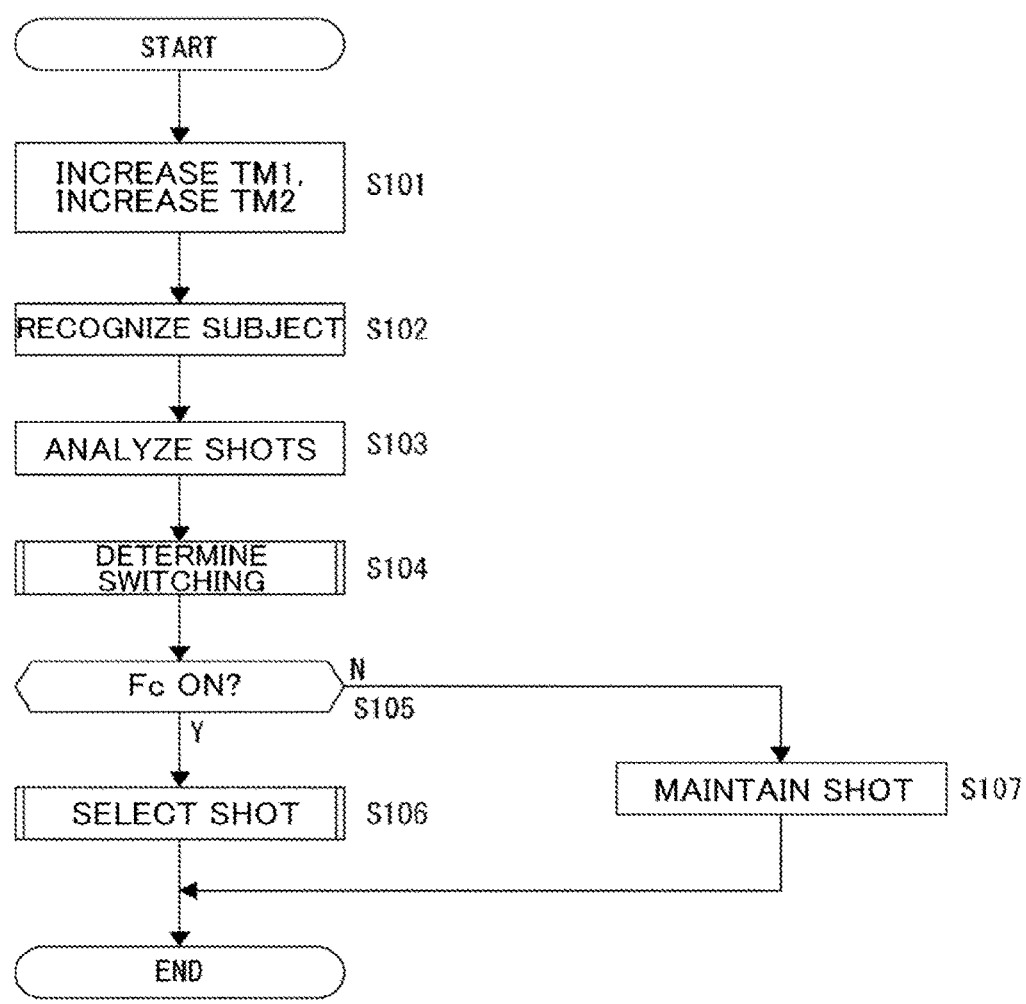
FIG. 16 is a flowchart illustrating a process for each frame according to the embodiment.

FIG. 16 illustrates a process performed at each frame timing (or an intermittent frame timing) of images supplied as the shots VD.

In step S101, the CPU 71 increases counters TM1 and TM2. The counter TM1 is a counter for monitoring the continuous period length of the current main image MP. The counter TM2 is a counter for monitoring a period for which the whole shot is not output.

In step S102, the CPU 71 performs a subject recognition process on each of the input shots VD by the function of the above-described subject recognition unit 34. In step S103, the CPU 71 performs shot analysis by the function of the above-described shot analysis unit 35. That is, the image classification of each shot VD is determined.

In step S104, the CPU 71 performs a switching determination process by the function of the above-described switching control unit 33. This is a process of determining whether a current time is a switching timing of the main image MP.

Figure 17:
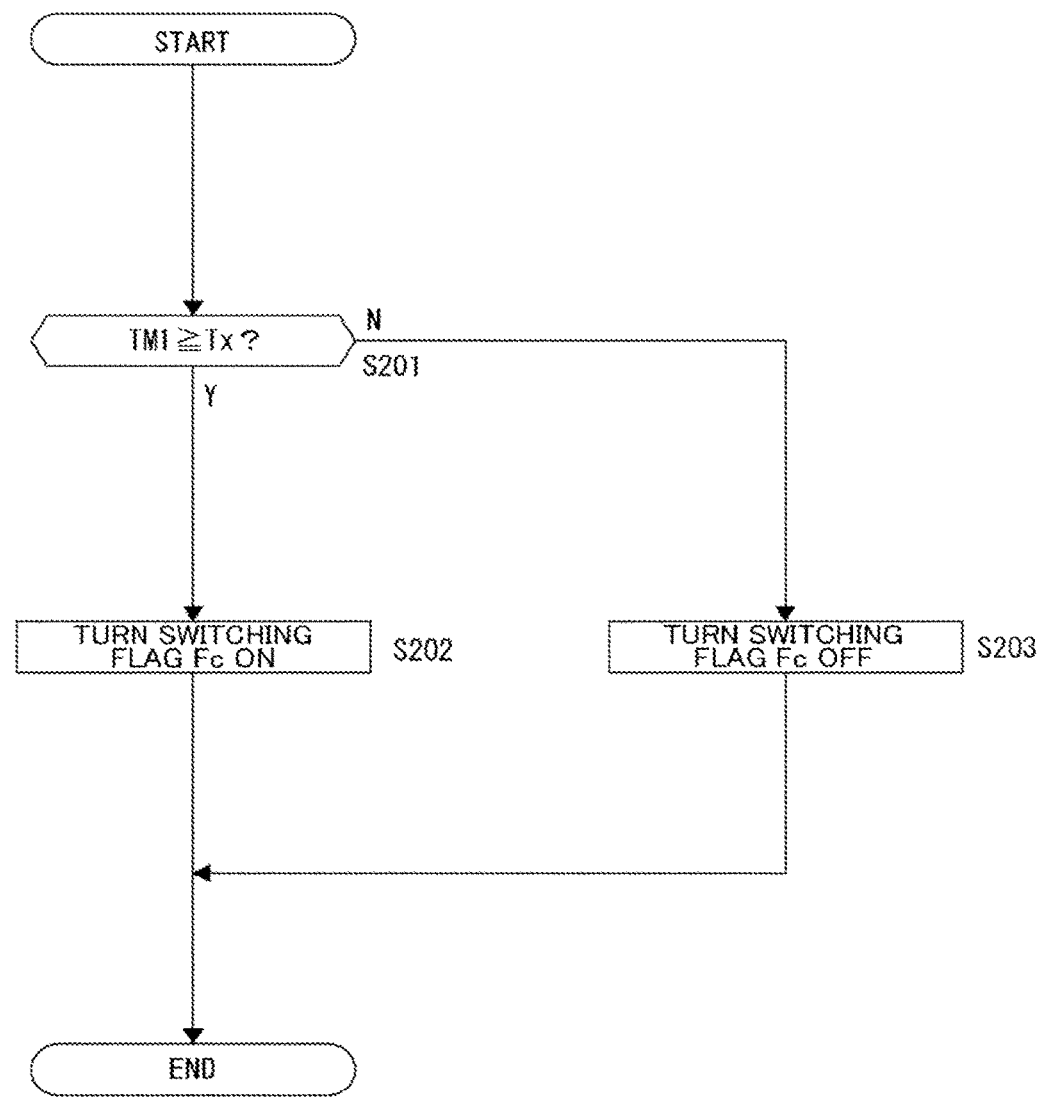
FIG. 17 is a flowchart illustrating a switching determination process according to a first embodiment.

The switching determination process is illustrated in FIG. 17.

In step S201, the CPU 71 compares a continuous period length Tx set in the shot VD serving as the current main image MP with a time measured by the counter TM1.

When TM1≥Tx is not satisfied, the CPU 71 determines that the current time is not the switching timing and turns the switching flag Fc off in step S203.

When TM1≥Tx is satisfied, the CPU 71 determines that the current time reaches the switching timing and turns the switching flag Fc on in step S202.

When the process of step S104 in FIG. 16 is performed in FIG. 17, the CPU 71 branches the process with reference to the switching flag Fc in step S105.

When the switching flag Fc is turned off, it is determined in step S107 that the shot VD of the current main image MP is maintained as the main image MP as it is. Actually, the switching control unit 33 does not perform the switching control on the switching unit 40.

When the switching flag Fc is turned on in step S105, the process proceeds to step S106 and the CPU 71 performs a shot selection process.

Specifically, the main image selection unit 31 selects the shot VD to be output as the subsequent main image MP, the period setting unit 32 sets the continuous period length Tx of that shot VD, and the switching control unit 33 performs the switching control on the switching unit 40.

Figure 18:
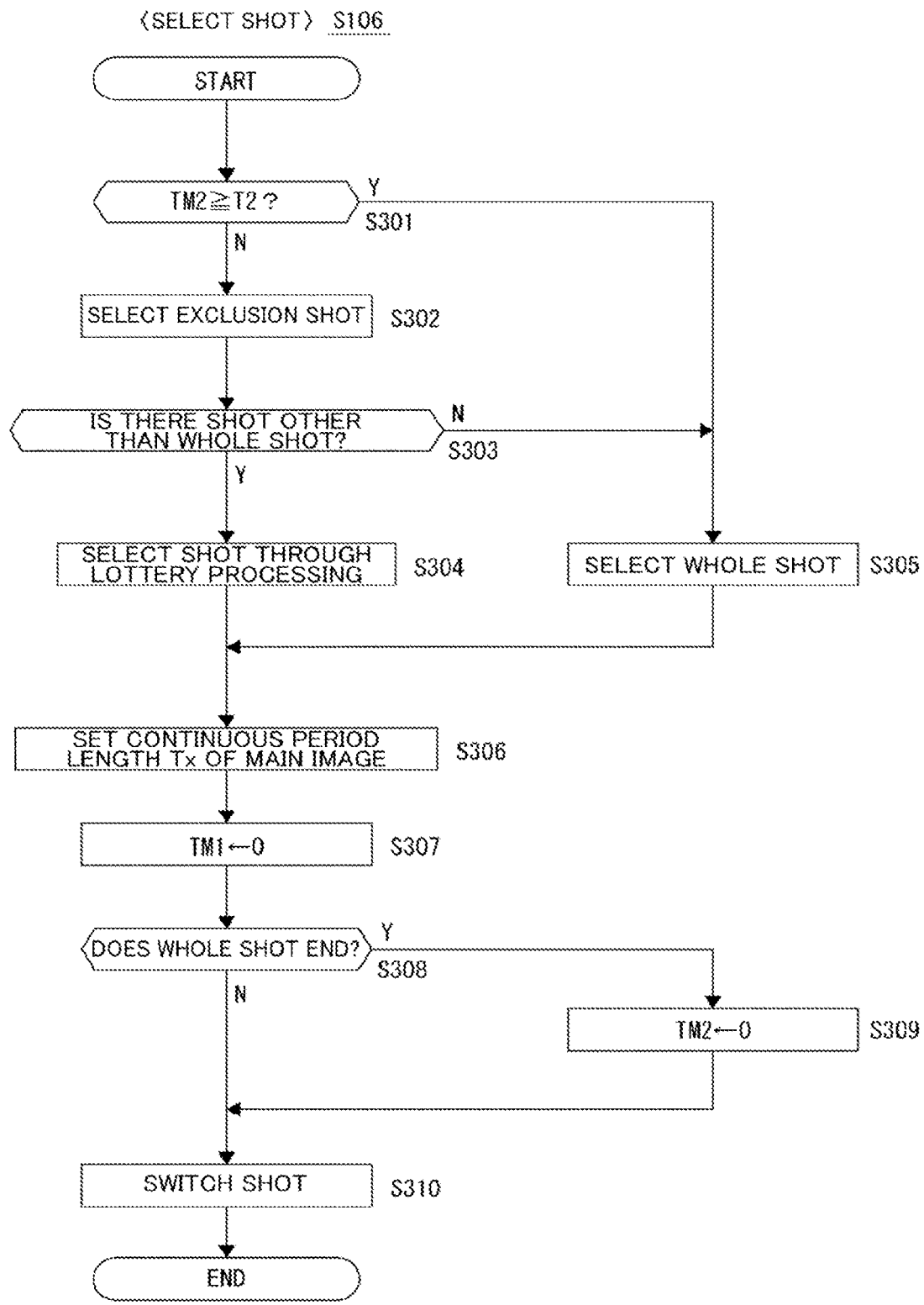
FIG. 18 is a flowchart illustrating a shot selection process according to the first embodiment.

The shot selection process of step S106 is illustrated in FIG. 18.

In step S301, the CPU 71 compares the counter TM2 with a second period length T2. The period length T2 is a fixed value which is a comparison reference serving as an interval of the whole shot. Since the whole shot is an image obtained by imaging a whole event used to easily transfer event details to a viewer, it is preferable to output the whole image as the main image MP frequently to some degree. In other words, it is not preferable to considerably lengthen the interval of the whole shot (a period for which the whole shot is not output) as the moving-image content. Accordingly, it is determined whether the interval of the whole image is not considerably long.

For example, the period length T2=30 seconds or the like is set.

On the other hand, the counter TM2 is reset when the main image MP is switched from the whole shot to the shot VD of another image classification. Therefore, a time of the interval of the whole shot is counted.

Accordingly, when TM2≥T2 is satisfied, step S301 proceeds to step S305 and the CPU 71 selects the whole shot as the subsequent main image MP.

This is a process of determining that the whole shot is soon inserted when the time in which the whole shot is not output exceeds, for example, 30 seconds. When there are a plurality of whole shots, it is conceivable that the whole shot is selected at random from the whole shots.

Conversely, when TM2≥T2 is satisfied, step S301 proceeds to step S302 and the CPU 71 selects the subsequent main image MP in conformity with a predetermined selection rule.

In step S302, an exclusion shot which is not appropriate for the subsequent main image MP is determined.

For example, it is assumed that there is a selection rule indicating that "a shot which is the same as or equivalent to a shot of a current main image" is not selected as the subsequent main image MP.

In this case, the "same shot" is the shot VD serving as the current main image MP. The "equivalent shot" is a shot of the same subject as the shot VD serving as the current main image MP, the shot at the same angle and angle of field, a shot with the same size or composition, or the like.

Since The shot VD is not changed in terms of the moving image despite being switched, the shot VD is excluded from a selection candidate.

The shots VD which are determined not to be the exclusion shot in step S302 are candidate shots to be selected as the subsequent main image MP.

In step S303, the CPU 71 checks whether there is the shot VD other than the whole shot among the candidate shots VD.

When the candidates do not remain except for the whole shot, the CPU 71 selects the whole shot as the subsequent main image MP in step S305.

When there is the shot VD other than the whole shot (when all the candidates are the shots other than the whole shot or some of the candidates are the whole shots and there is the shot VD other than the whole shot), the process proceeds to step S304 and the CPU 71 selects the shot VD serving as the subsequent main image MP from the candidates through lottery processing.

In this case, one of the shots VD which are candidates for one of the whole shot, the main subject shot (the main shot or the speaker shot), and the support shot is selected through random lottery.

When the shot VD serving as the main image MP is selected in step S304 or S305, the CPU 71 sets the continuous period length Tx of the main image MP in accordance with the image classification of the selected shot VD in step S306. For example, as in the first example of FIG. 15, the continuous period length Tx is set in accordance with the image classification. Alternatively, as in the second example, the current continuous period length Tx is set within a time range in accordance with the image classification.

In step S307, the CPU 71 resets the counter TM1. This is performed to monitor the continuous period length Tx of the subsequent main image MP (see step S201 of FIG. 17).

In step S308, the CPU 71 checks whether a timing is an end timing of the whole shot. That is, it is checked whether the current shot is currently the shot other than the whole shot and the shot VD selected in step S304, that is, the subsequent main image MP, is the image classification other than the whole shot. Then, the process is branched in accordance with the result.

When the current timing is a timing at which the whole shot is switched to the shot VD of another image classification, the process proceeds to step S309 and the CPU 71 resets the counter TM2. This is performed to monitor the time of the interval of the whole shot (see step S301).

In step S310, the CPU 71 performs the switching control on the switching unit 40 by the function of the switching control unit 33. That is, the switching control is performed such that the shot VD selected in step S304 or S305 becomes the main image MP.

When the foregoing processes of FIG. 16 including the processes of FIGS. 17 and 18 are performed at, for example, each frame timing, the switching illustrated in FIG. 15 is realized.

Although not illustrated, when there is a user operation, the switching control unit 33 may perform the switching control on the switching unit 40 immediately or a timing of a subsequent frame as an interruption process in response to the user operation. This point is similar in the following second embodiment.

5. Example of Process According to Second Embodiment

Incidentally, in the foregoing first embodiment, the example in which the selection rule of step S302 is simple has been described. An exemplary process according to the second embodiment is an example in which a more detailed selection rule is used in accordance with each of the main shot, the support shot, the whole shot, and the like.

Further, the exemplary process according to the second embodiment is an exemplary process in which switching is performed not only at a timing based on the set continuous period length Tx but also another timing.

Since the process at each frame timing is similar to that of FIG. 16, description thereof will be omitted. The switching determination process of step S104 in FIG. 16 is illustrated in FIG. 19 and the shot selection process of step S106 is illustrated in FIG. 20 for description.

Figure 19:
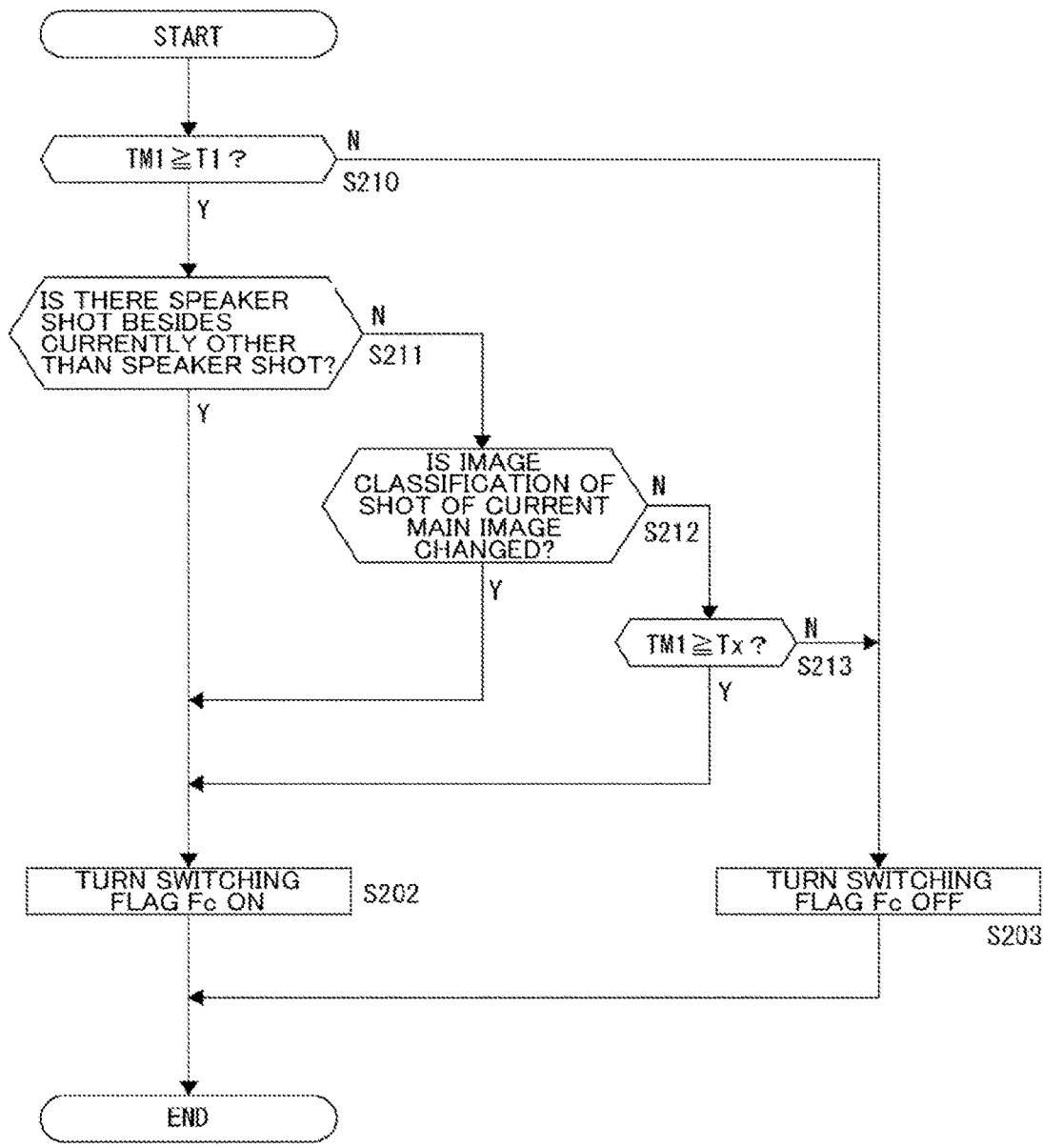
FIG. 19 is a flowchart illustrating a switching determination process according to a second embodiment.
Figure 20:
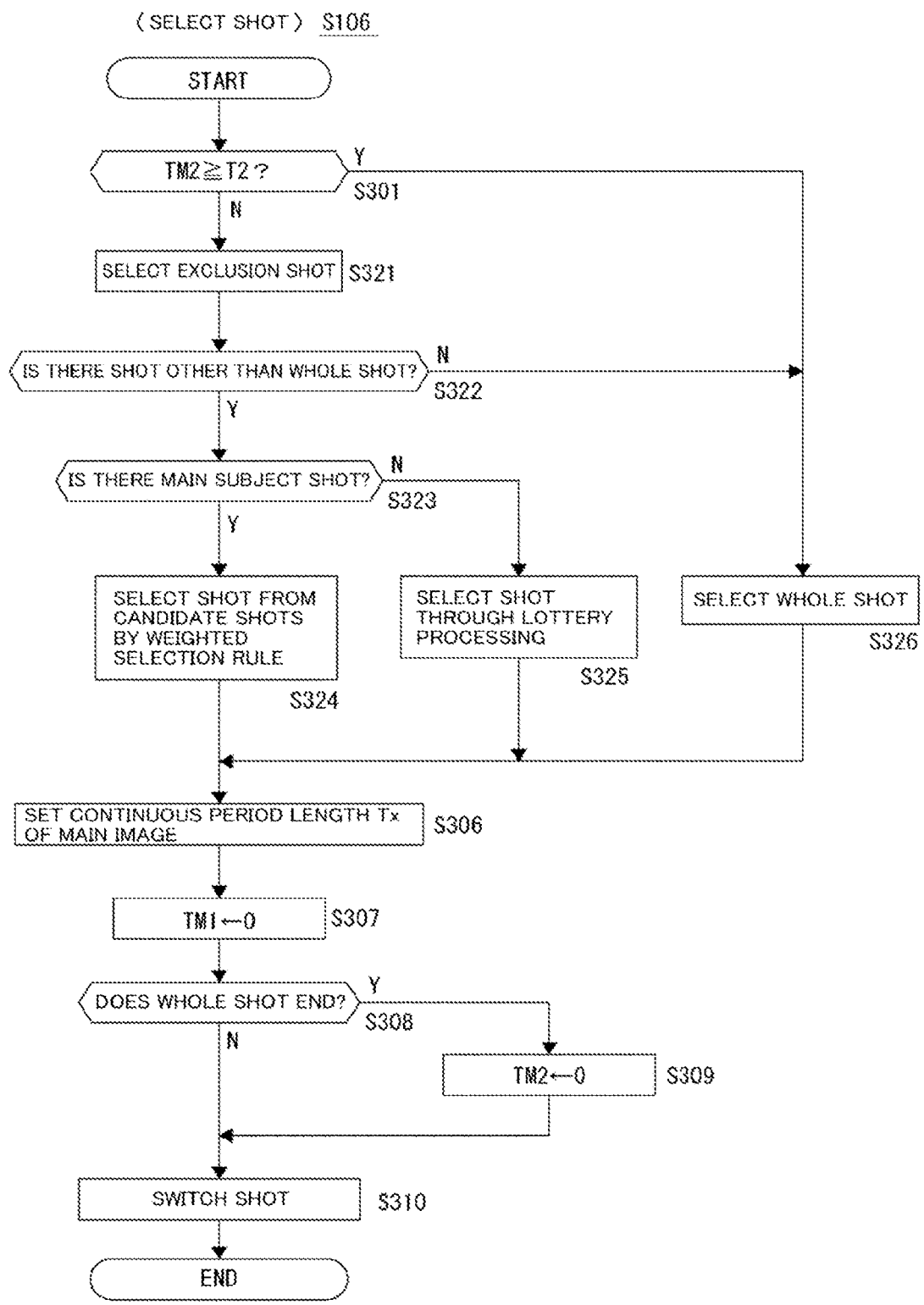
FIG. 20 is a flowchart illustrating a shot selection process according to the second embodiment.

In FIGS. 19 and 20, the same step numbers are given to the same processes as those of FIGS. 18 and 19.

In the switching determination process illustrated in FIG. 19, in step S210, the CPU 71 first performs a process of comparing the counter TM1 with the first period length T1.

The period length T1 is assumed to be a fixed value set as a lowest limit time in which the main image MP is not switched. For example, the period length T1=3 seconds or the like is set. A process of not switching the main image MP which has been selected once at least 3 seconds (keeping the main image MP) is performed using the period length T1.

That is, when TM1≥T1 is not satisfied in step S210, the CPU 71 does not keep the current main image MP for only the period length T1 (for example, the main image MP is selected and 3 seconds has not passed) and keeps the state of the main image MP as it is. Therefore, in step S203, the switching flag Fc is turned off. Thus, the switching is not performed (see step S107 of FIG. 16).

Conversely, when TM1≥T1 is satisfied in step S210, the switching of the main image MP is allowed. Thus, the CPU 71 causes the process to proceed to step S211.

In step S211, the CPU 71 currently considers a certain shot VD which is not the speaker shot as the main image MP and checks whether there is a different talking shot.

When the current main image MP is not the speaker shot and there is a different speaker shot, the process proceeds to step S202 and the CPU 71 turns the switching flag Fc on.

When the current main image MP is the speaker shot or when the current main image MP is not the speaker shot and there is a different speaker shot, the CPU 71 causes step S211 to proceed to step S212. Then, the CPU 71 checks whether the image classification PD of the shot VD serving as the current main image MP is changed.

For example, there is a case in which the shot VD determined to be a "main subject shot" does not correspond to the main subject shot, such as a case in which the subject of the shot VD determined to be the speaker shot stops talking or a case in which a main member goes from the stage to the backstage in the shot VD in which the main member is ascertained.

When a camera angle of the shot VD in which a support member is being imaged is changed and a main member is imaged, the image classification PD is changed from the support shot to the main shot.

When the image classification of the current main image MP is changed, the process proceeds to step S202 and the CPU 71 turns the switching flag Fc on.

When the image classification of the current main image MP is not changed, step S212 proceeds to step S213 and the CPU 71 compares the continuous period length Tx set in the shot VD serving as the current main image MP with a time measured by the counter TM1.

When TM1≥Tx is not satisfied, the CPU 71 determines that the current time is not the switching timing and turns the switching flag Fc off in step S203.

When TM1≥Tx is satisfied, the CPU 71 determines that the current time reaches the switching timing and turns the switching flag Fc on in step S202.

When the switching determination process is performed in this way, not only is the switching timing set in accordance with the continuous period length Tx but the switching timing set in accordance with a circumstance such as a change in shot details or a change in the speaker.

When the switching flag Fc is turned on, the process of FIG. 16 proceeds to the shot selection of step S106.

In the process of the shot selection, the CPU 71 first compares the counter TM2 with the period length T2 in step S301 of FIG. 20. That is, the process is a process in which the time of the interval of the whole shot is not too long as in FIG. 18.

When TM2≥T2 is satisfied, a period for which the whole shot is not output becomes long (for example, 30 seconds has passed), step S301 proceeds to step S326, and the CPU 71 selects a whole shot as the subsequent main image MP.

Conversely, TM2≥T2 is not satisfied, step S301 proceeds to step S321 and the CPU 71 selects the subsequent main image MP in conformity with a predetermined selection rule.

In step S321, an exclusion shot which is not appropriate for the subsequent main image MP is determined. In this case, the following selection rules are used.

"A shot which is the same as or equivalent to a shot of a current main image" is not selected as the subsequent main image MP.

"A shot of the same subject as the shot of current main image in a case in which the current main image is the support shot" is not selected as the subsequent main image MP.

"A support shot in a case in which the current main image is the whole shot and there is a different main shot" is not selected as the subsequent main image MP.

"A support shot in a case in which the current main image is a support shot and there is a different main shot" is not selected as the subsequent main image MP.

"A shot other than a speaker shot in which there is the speaker shot" is not selected as the subsequent main image MP.

When there is the shot corresponding to each current shot VD is in the current shot VD in step S321, the CPU 71 excludes the shot from candidates for the subsequent main image MP. The shot which is not excluded becomes a shot of the candidate selected as the subsequent main image MP.

When the exclusion shot is selected, the CPU 71 checks whether there is the shot VD other than the whole shot among the candidate shots VD in step S322.

When only the whole shot remains as a candidate, the CPU 71 selects the whole shot as the subsequent main image MP in step S326.

When there is the shot VD other than the whole shot (when all the candidates are the shots other than the whole shot or some of the candidates are the whole shots and there is also the shot other than the whole shot), the process proceeds to step S323 and the CPU 71 first determines whether there is the main subject shot (the main shot or the speaker shot) among the candidates.

When there is no main subject shot in the candidates, the process proceeds to step S325 and the CPU 71 selects the shot VD serving as the subsequent main image MP from the candidates through lottery processing. In this case, one of the shots VD which are candidates for the whole shot and the support shot is selected by random lottery.

When there is the main shot among the candidates, the process proceeds to step S324 and the CPU 71 selects the shot VD serving as the subsequent main image MP in conformity with weighted selection rules of each shot among the candidates.

For example, the shot is selected from the shots VD of the candidates by the following selection rules.

When there is a speaker shot, the speaker shot is selected.

When there are a main subject shot and a support shot, a shot is selected stochastically so that a ratio of a main subject and the support member is constant (for example, five to one).

When there is the shot of the same image classification, the shot is selected at random. The shot may be preferentially selected by a shot size or the number of subject peoples.

When there is no selectable shot, the whole shot is selected.

According to the weighted selection rule, weighted selection is performed such that the speaker shot is first preferred and the main shot is second preferred.

When the shot VD serving as the main image MP is selected in step S324, S325, or S326, the CPU 71 sets the continuous period length Tx of the main image MP in accordance with the image classification of the selected shot VD in step S306. For example, as in the first example of FIG. 15, the continuous period length Tx is set in accordance with the image classification. Alternatively, as in the second example, the continuous period length Tx is set within a time in accordance with the image classification.

As in the example of FIG. 18, the CPU 71 resets the counter TM1 in step S307, checks in step S308 whether a timing is an end timing of the whole shot. In the case of a timing at which the present shot is switched from whole shot to the shot VD of another image classification, the process proceeds to step S309 and the CPU 71 resets the counter TM2.

In step S310, the CPU 71 performs switching control on the switching unit 40 by the function of the switching control unit 33. That is, the switching control is performed such that the shot VD selected in step S324, S325, or S326 becomes the main image MP.

When the foregoing processes of FIG. 16 including the processes of FIGS. 19 and 20 are performed at, for example, each frame timing, the switching illustrated in FIG. 15 is realized.

Further, in the second embodiment, for example, when a speaker is changed in interview relay or the like by the determination of step S211 of FIG. 19 and steps S323 and S324 of FIG. 20, the main image MP is switched to the speaker shot quickly irrespective of the continuous period length Tx. That is, a most important subject can be set as the main image MP at an appropriate timing. When an intention (a subject or a state of the subject) of the shot VD is changed (for example, when a main member goes down to the back of a stage), unintended image details may be set, but the main image MP is switched to another shot VD quickly irrespective of the continuous period length Tx by the determination of step S212 of FIG. 19 and steps S321, S323, S324, and S325 of FIG. 20.

Through such a process, it is possible to generate image content with good detail quality more appropriate for a real state such as an event.

Here, for example, although a speaker is changed, the current main image MP continues for at least the period length T1 (for example, 3 seconds) through the process of step S210 at a spot at which an appearance is bad (a spot of a broadcasting accident) when a video is switched in a very short time. Thus, image content of a bad appearance as in hurried switching is not allowed. This contributes to an improvement in detail quality of image content.

The number of selection rules of step S321 (the rules for the shot excluded from the candidates) is five, but all of the rules may not be used. A selection rule for an exclusion shot other than the five selection rules may be used.

In step S324, four selection rules for weighted selection have been exemplified, but all of the rules may be not used. A selection rule for weighted selection other than the four selection rules may be used.

6. Conclusion and Modification Examples

According to the foregoing embodiments, the following advantageous effects can be obtained.

The image processing device according to the embodiment includes the main image selection unit 31 that selects one shot VD serving as the main image MP among the plurality of shots (images) VD (S301 to S306 of FIG. 18 and S301 to S326 of FIG. 20).

The image processing device includes the period setting unit 32 that sets the continuous period length Tx in which the shot VD selected by the main image selection unit 31 (the selected image) is continued as the main image MP in accordance with the image classification to which the selected shot VD corresponds among the plurality of image classifications (S306).

Thus, the continuous period length Tx of the main image MP can be variably set in accordance with image details, for example, a whole shot, a main subject shot of a main member, a speaker, or the like, or a support shot, and thus the moving-image content to be broadcast or recorded can be realized in accordance with a purpose or an intention of the broadcasting or the like.

By automatically performing such switching, broadcasting or recording of an interesting moving image with a natural detail and high quality can be performed without an operation burden on a user (an operator).

For example, only when a shot with high importance such as the shot VD in which a speaker is just shown is switched in accordance with such as a predetermined evaluation value, the same shot VD is continued for a long time or the shot VD is frequently switched, and thus a viewer may feel unnatural. In the case of the embodiment, by determining the continuous period length Tx in accordance with the image classification in principle, it is possible to reduce occurrence of unnatural switching.

In the process at the rear stage of the switching of the main image MP, that is, image content in which the selected shots VD continue is assumed to be output as, for example, broadcast image in real time, but the present technology is not limited thereto.

For example, a moving image after the switching may be recorded on a recording medium, may be displayed on a display device, or may be uploaded to a predetermined server via a network such as the Internet.

Selection information regarding the main image MP aligned on a time axis of a moving image may be recorded, transferred, or the like as metadata along with an image of each shot VD and similar switching may be performed later using the metadata.

The metadata or each shot VD may be transferred to an editing device, some or all of the metadata may be updated as the selection information of the main image MP as re-editing, and moving-image content may be generated through another switching while using first switching.

In the embodiment, the moving image has been described mainly as a target, but the present technology may be applied to selection of a still image serving as the main image MP. For example, a plurality of still images may be displayed as a slide show, or broadcasting, uploading, or the like may be performed. By setting the continuous period length of the main image MP, that is, the time in which the still image is displayed, in accordance with the image classification of the details of the still image, it is possible to realize a slide show which arouses a more viewer's interest than that of a slide show of each simple constant time.

In the exemplary process of FIG. 16, the shot VD is selected and switched in step S106 at a time point at which the switching flag Fc is turned on. Thus, the shot can be selected while reflecting a situation of each shot VD at the time point at which the switching is performed.

On the other hand, at a time point at which the switching flag Fc has not yet been turned on, the shot VD serving as the subsequent main image MP may be selected. At a time point at which the switching flag Fc is turned on, the shot VD may be switched to the subsequent shot VD which has been selected. Thus, a processing burden in the switching of the shot is reduced.

The image classifications of the shots are not limited to the examples of the "main subject shots (the main shot and the speaker shot)", the "support shot", and the "whole shot".

Sub-classifications of the main subject shot may be more diverse as in, for example, a speaker shot, a first main shot, a second main shot, and the like. Similarly, an image classification distinguished for each support member such as a first support shot and a second support shot may be provided.

Further, image classifications of a regular screen shot indicating a regular screen, such as a comment shot indicating a comment screen or a title shot, a landscape shot indicating a landscape in which there is no person, an interruption shot in which a special situation occurs may be provided.

In the embodiment, the continuous period length Tx is a length of a period from which one image which is a selected image is switched to the main image MP until another image serving as a subsequent image selected by the main image selection unit 31 among a plurality of images is switched to the main image MP. The continuous period length is determined in accordance with the image classification of the shot VD serving as the main image MP, so that the main shot, the speaker shot, the support shot, the whole shot, and the like in a broadcasting image or the like are distributed in accordance with an imaging target, a broadcasting intention, or the like. Thus, the switching of the shot VD which is not unnatural or boring is realized.

Incidentally, the continuous period length in accordance with the image classification may be fixed or varied.

For example, it is conceivable that fixed values are set in accordance with the image classifications in such a manner that the main subject shot is set to 8 seconds, the support shot is set to 4 seconds, and the whole shot is set to 6 seconds, or the main subject shot is set to 8 seconds, the support shot is set to 6 seconds, and the whole shot is set to 4 seconds. Of course, even in the main subject shot, the speaker shot may be set to 8.5 seconds and the main shot may be set to 7.5 seconds delicately.

On the other hand, the continuous period length may be set variably within each range in such a manner that the support shot is set in the range of 2 seconds to 4 seconds, the whole shot is set in the range of 4 seconds to 6 seconds, and the main subject shot is set in the range of 6 seconds to 8 seconds. In this way, the switching timing of the shot VD can be diversified to promote automatic switching so that a viewer may not feel bored.

In the embodiment, the example in which the image classifications of the shots VD are determined based on subject information regarding the shots VD has been given. For example, the image classifications of the whole shot, the speaker shot, the main shot, the support shot, and the like are set in advance for each shot VD or are determined through a user operation, and may be determined based on the subject information. For example, a subject is determined through image analysis and the corresponding image classification is determined.

By determining the image classification based on the subject information, it is not necessary for the user to perform an operation and the operation can be facilitated. Even when the subject of the shot VD is changed, the continuous period length Tx can be handled immediately and set appropriately.

As described in the first and second embodiments, the image processing device includes the switching control unit 33 that switches the main image MP in accordance with the continuous period length Tx set by the period setting unit 32 (S310).

Then, the switching control unit 33 performs control such that the main image MP is switched to another shot VD under the condition that the period length T1 shorter than the continuous period length Tx has passed (S210) even when the continuous period of the current main image MP does not reach the continuous period length Tx set by the period setting unit 32 through detection of a predetermined situation (S211, S212, S202, and S310).

In this way, by providing a case in which the shot VD output as the main image MP is switched to another shot VD even at a time point at which the continuous period does not reach the continuous period length Tx, it is possible to handle a case in which urgent switching is good.

Here, at this time, the switching of the main image MP may not be performed until the continuous period reaches the period length T1 set as a minimum period length which is short to some degree. Thus, after a certain shot VD becomes the main image MP, the certain shot MP is not switched to another shot VD immediately. When the shot VD is switched in a considerably short time, the viewer may feel unnatural or consider that the shot VD is an uncomfortable image. Thus, since quality of a broadcasting image or moving-image content is degraded, such a thing is set not to occur.

In the second embodiment, the example has been described in which when the image classification of the shot VD serving as the main image MP is changed from the image classification upon selection as the main image MP by the main image selection unit 31, control is performed such that the main image MP is switched to another image under the condition that the period length T1 shorter than the continuous period length Tx passes (S212 and S202 of FIG. 19).

The image classification of the shot VD selected as the main image MP may be changed in some cases. For example, a main member goes down to the back of a stage in the shot VD in which the main member on the stage is ascertained and the main member disappears in some cases. In these cases, when the current main image MP continues as it is, an unintended image continues in broadcasting or the like and the viewer may easily feel an unnatural image. Accordingly, even when the period length does not reach the set continuous period length, the main image MP is switched to another shot VD. Thus, the natural main image is output and an appropriate main image is output. Here, in this case, the main image MP is not switched until the period length reaches the period length T1. Thus, after the certain shot VD becomes the main image MP, the certain shot VD is not switched to another shot VD immediately so that an unnatural sense, quality degradation, or the like does not arise.

In the second embodiment, the example has been described in which when the shot VD of which the image classification is the speaker shot occurs in the shot VD not serving as the main image MP, control is performed such that the main image MP is switched to the shot VD of which the image classification is the speaker shot under the condition that the period length T1 shorter than the continuous period length Tx passes (S211 and S202 of FIG. 19 and S324 of FIG. 20).

For example, when a speaker is appropriate for the main image MP, a certain person (Mr. A) is the speaker in the main image MP, and another person (Mr. B) becomes the speaker, it is unnatural for an image of Mr. A to remain as the main image MP. Accordingly, even when the image of Mr. A does not reach the set continuous period length, the image of Mr. A is switched to an image of Mr. B. In this way, switching appropriate for an occasion can be realized without be limited to the set continuous period length Tx, and thus it is possible to improve quality of image content to be broadcast or recorded.

Even in this case, the main image MP is not switched until the period length reaches the period length T1. Thus, after the certain shot VD becomes the main image MP, the shot VD is not switched immediately to another shot VD so that an unnatural sense, quality degradation, or the like does not arise due to the switching of the image in a considerably short time.

In the first and second embodiments, when the period for which the shot VD of which the image classification is the whole shot is not the main image MP passes the period length T2, the shot VD of which the image classification is the whole shot is selected as a new main image MP (S301 and S305 of FIG. 18 and S301 and S326 of FIG. 20).

The whole shot can transfer a whole image of an event to the viewer. That is, when the viewer sees the whole shot, it is easy for the viewer to ascertain details of a situation of the event.

For example, in the interview event as in FIG. 10, a situation of an interview is easily transferred by the whole shot. In a musical live event as in FIG. 9, the viewer easily understands a situation of the musical live, a performance situation, and the like by the whole shot. Therefore, the whole shot is the main image MP at an interval to some degree using the period length T2 as a reference. Thus, it is possible to produce the image content in which it is easy to transfer the details to the viewer.

In the processes of selecting the shot in FIGS. 18 and 20, the counter TM2 for determining the period length T2 is reset in step S308 using a time point of the switching from the whole shot to another shot as a starting point. Therefore, the value of the counter TM2 is an elapsed time from the time at which the whole shot does not become the main image MP.

The present technology is not limited thereto and the value of the counter TM2 may be an elapsed time from a time point at which the whole shot finally becomes the main image MP. That is, in step S308, it may be determined whether the whole shot is switched. In step S309, the counter TM2 may be reset. In this case, since a value obtained by subtracting a period (for example, the continuous period length Tx) of the whole shot serving as the main image MP from the value of the counter TM2 is a period for which the whole shot is not the main image MP, the period length T2 may be appropriately set in accordance with the obtained value.

In the embodiment, one image is selected as the main image MP from the plurality of images classified into the image classification including one of at least the main subject shot (the main subject image), the support shot (the sub-subject image), the whole shot (the whole image). In this case, the example has been described in the continuous period length Tx is set in accordance with the image classifications such as the main subject shot, the support shot, and the whole shot. Alternatively, the continuous period length Tx may be set in accordance with the image classifications such as the speaker shot, the main shot, the support shot, and the whole shot.

As representative shots in the case of an event or the like, the shots are classified into the whole shot, a main subject shot such as a main member or a speaker, and a support shot other than the main member or the speaker. By outputting such a shot VD with each appropriate period length, it is possible to realize automatic switching in which the viewer keeps an interest.

In the embodiment, the example has been described in which the continuous period length is set in accordance with the image classification so that the continuous period length Tx of the main subject shot is the longest and the continuous period length Tx of the whole shot or the support shot is the shortest. For example, the continuous period length is set so that a relation of the main subject shot>the support shot>the whole shot is satisfied. Since the main subject shot is an image desired to appeal a viewer, the continuous period length Tx is set to be long. Since the whole shot (so-called a "faraway" image) is important to convey an imaging target, it is preferable to select the whole shot frequently. It is preferred to shorten the continuous period length Tx once to deal with the frequent selection. By performing the switching in such setting, it is possible to output an image which is automatically controlled and a viewer rarely feels bored about.

For example, the continuous period length Tx may be set in the order of the main subject>the whole shot>the support shot. For example, this is because it is appropriate to shorten the support shot when a moving image in which a main member is conspicuous is intended to be produced.

In the embodiment, the example has been described in which the shot VD serving as the subsequent main image MP is selected from the plurality of shots VD other than the shot serving as the main image MP using a process in accordance with the predetermined selection rule (S301 to S305 of FIG. 18 and S301 to S326 of FIG. 20).

For example, the exclusion shot is determined in accordance with the selection rule in step S302 or S321 and the shot VD serving as the subsequent main image MP is selected from the candidate shots which have not been excluded in steps S312 to S316. In this way, by selecting the subsequent shot VD from all the shots VD at random, it is possible to also realize switching assumed to be appropriate for a viewer.

The random selection in the lottery processing of step S304 has been described, but is random lottery after the exclusion shot is excluded in accordance with the selection rule. Therefore, unlike random selection from all the shots VD, the random selection is selection appropriate in terms of the details and unfixed selection.

In the example of FIG. 20, the shot more appropriate for an intention to produce a moving image is selected by using the weighted selection rule of step S324. In step S324, the random lottery such as "the shot is selected at random when there are the shots of the same image classification" is partially used, and thus the selection appropriate in terms of details and unfixed selection is also performed.

As described above, one process in accordance with the selection rule in the embodiment is the process in which when the shot VD serving as the main image MP is not the main subject shot and there are shots VD which are other main subject shots, these shots VD are set as candidates for the subsequent main image MP.

When the current main image MP is the support shot or the whole shot and is not the main subject shot, and a different main subject shot is the main image MP, the shot in which a viewer does not feel discomfort is selected. Therefore, it is appropriate for the different main subject shot to remain as a candidate which is selected as the main image MP. Accordingly, the shot VD appropriate for moving image composition is selected as the subsequent main image MP.

Specifically, another main subject shot in a case in which the current main image MP is the support shot or the whole shot is not a shot excluded from the selection targets in step S321 of FIG. 20. This is because the shot does not correspond to "a support shot in a case in which the current main image is the whole shot and there is a different main shot" or "a support shot in a case in which the current main image is a support shot and there is a different main shot".

Since the main subject shot in this case is easily selected as the subsequent main image MP in step S324, the main subject shot can be selected more frequently than the other shots.

As described above, one process in accordance with the selection rule in the embodiment is the process in which when the shot VD serving as the main image MP is the main subject shot and there are shots VD which are other main subject shots, these shots VD are set as candidates for the subsequent main image MP. When the current shot VD is the main subject shot and there is a different main subject shot, the different main subject shot in which a viewer does not feel discomfort is selected despite the different main subject shot serving as the main image MP. Therefore, it is appropriate for the different main subject shot to remain as a candidate which is selected as the main image MP.

Specifically, the different main subject shot is not a shot excluded from candidates selected in step S321 of FIG. 20. That is, this is because the different main subject shot does not correspond to "a shot which is the same as or equivalent to a shot of a current main image", "a shot of the same subject as the shot of current main image", or "a shot other than a speaker shot in which there is the speaker shot".

Since the different main subject shot in this case is easily selected as a subsequent shot in step S324, the main subject shot can be selected relatively frequently. In particular, in this case, the switching rule can be effective even when there are a plurality of main members or a speaker is changed.

As described above, one process in accordance with the selection rule in the embodiment is the process of excluding the shot VD of the same image classification as the shot VD serving as the current main image MP from the candidates for the subsequent main image MP.

Specifically, "a shot which is the same as or equivalent to a shot of a current main image" or "a shot of the same subject as the shot of current main image in a case in which the current main image is the support shot" is excluded from the selection targets in step S321 of FIG. 20. Thus, it is possible to prevent an image in which the same subject continues and a viewer may feel bored from being output.

As described above, one process in accordance with the selection rule in the embodiment is the process of excluding the shot VD including the same sub-subject (for example, a support member) as the subject of the shot VD serving as the current main image MP from the candidates for the subsequent main image MP.

Specifically, an image in which a support member is shown, such as "a shot which is the same as or equivalent to a shot of a current main image" or "a shot of the same subject as the shot of current main image in a case in which the current main image is the support shot" is excluded from the candidates for the subsequent main image MP in step S321 of FIG. 20.

For example, the support shot in a case in which the current main image MP is the whole shot or another support shot in which a support member is shown in a case in which the current main image MP is the support shot is not selected as the subsequent main image MP. Thus, it is possible to prevent the same support subject from continuing. This means that an image in which a viewer misunderstands the support member as a main member can be avoided.

As described above, one process in accordance with the selection rule in the embodiment is the process of excluding a sub-subject image from the candidates for the subsequent main image MP when the shot VD serving as the current main image MP is the whole shot and there is a main subject image as another image. That is, a support member is not displayed as much as possible at a timing after the whole shot is displayed.

Specifically, in step S321 of FIG. 20, "a support shot in a case in which the current main image is the whole shot and there is a different main shot" is excluded from the candidates for the subsequent main image MP. Thus, the shot is not too often switched to the support shot after the whole shot. That is, only when there is no main subject shot, the shot is switched to the support shot.

A viewer tends to easily recognize a subject shown after the whole shot as a main member. Thus, a situation in which the support shot is output after the whole shot and a viewer misunderstands a support member as a main member does not occur.

In the embodiment, as described above, the whole shot is selected as the subsequent main image MP through the process in accordance with the selection rule when there is no shot VD which is a candidate for the subsequent the main image MP other than the whole shot (S303 and S305 of FIG. 18 and S322 and S326 of FIG. 20).

For example, as a result of the selection of the exclusion shot in step S302 or S321, a case in which all the shots VD are not candidates even by the selection rule or a case in which all the shots VD except for the whole shot are not candidates is assumed. In this case, the whole shot is selected as the subsequent main image MP. This is because the whole shot is the shot which does not cause the viewer to misunderstand or be confused most and is desired to be inserted as much as possible.

By selecting the exclusion shot in step S312 or S321 through this process, it is possible to avoid non-switching of the shot itself. That is, it is possible to obtain the advantageous effect of realizing selection of the appropriate main image by selecting the exclusion shot and prevent a circumstance in which the main image unselectable due to the determination of the exclusion shot.

In the second embodiment, as described above, the example has been described in which the shot serving as the subsequent main image MP is selected through a weighted selection process on each image among the shots which are candidates for the subsequent main image MP.

For example, as described above, in step S324, the subsequent main image MP is selected through the process based on the weighted selection rule in accordance with the image classifications of the shots VD of the candidates when the plurality of shots VD become candidates for the subsequent main image MP. For example, each of the speaker shot, the main shot, the support shot, and the whole shot is weighted.

Thus, for example, it is easy to select the speaker shot or the main shot. Further, priority differs between the main shot and the speaker shot. When there is the speaker shot, the speaker shot is preferred. This is because when there is a person who is talking despite a main member, the speaker is important as event details.

Through such weighting, a shot which a producer wants to show as much as possible can be easily selected and switching which meets a production intention is performed.

In step S324, randomness is also added. Rather than a simple process in which a main shot is merely selected when there is the main shot, there is a probability of the support shot or the whole shot being selected. Thus, automatic switching in more diverse selection orders can be realized and an image which a viewer rarely feel bored about can be output.

Weighting is not limited to the weighting in accordance with the image classifications. For example, as details of an image, it is conceivable that the weighting is performed in accordance with diverse elements such as the number of people of subjects, the size of a subject (an up-image or a whole body image, or the like), brightness of an image, and a tendency of color.

The weighting method is not fixed and may be changed at each time point or in response to a user operation or the like.

In the second embodiment, as described above, the example has been described in which when there is no main subject shot among the shots VD which are candidates for the subsequent main image MP, the subsequent main image MP is selected through random lottery processing on the shots which are the candidates.

That is, when the main subject shot is not included in the candidate as the result obtained by selecting the exclusion shot in step S321, random lottery processing is performed in step S325. In this case, the automatic switching in diverse selection orders is realized by performing random selection, and thus an image which a viewer rarely feels bored about can be output. When there is no main subject shot, it is hard to be inappropriate for an intention to produce an image despite random selection.

According to the above embodiment, by performing "generation of a switching timing in content" or "selection of an output image" in the content, it is possible to produce image content with higher quality.

More diverse modification examples of the embodiment are conceivable. Diverse selection rules or image classification are conceivable and a user may turn on/off the determinable selection rule or each of the image classifications to be determined.

For example, the detection of the speaker shot may be able to be turned off or the selection rule for the speaker shot may be able to be turned off.

For example, the detection of the main shot may be able to be turned off or the selection rule for the main shot may be able to be turned off.

For example, the detection of the main subject shot may be able to be turned off or the selection rule for the main subject shot may be able to be turned off.

For example, the detection of the support shot may be able to be turned off or the selection rule for the support shot may be able to be turned off.

By allowing the user to perform such selection, it is possible to adjust the selection so that the automatic switching is performed in accordance with an intention to produce moving-image content at that time.

A case in which a screen is divided and the plurality of shots VD are set as the main images MP may be added. It is also conceivable that the plurality of shots VD selected as the main image MP in this case are selected in accordance with the selection rules of the embodiments.

For example, when two shots are displayed in a screen division manner, it is conceivable that one main image MP is selected through the process of FIG. 18 or 20 and the other main image MP is selected at random from another shot, or both the main images MP are selected through the process of FIG. 18 or 20.

A program according to the embodiment is a program causing, for example, a CPU, a DSP, or the like or a device including this to perform the processes of FIGS. 16, 17, and 18 or the processes of FIGS. 16, 19, and 20 or the process corresponding to the modification example.

That is, the program according to the embodiment is a program causing an information processing device to perform a process of selecting one shot VD as the main image MP among the plurality of shots VD; and a process of setting the continuous period length Tx in which the selected shot VD is continued as the main image MP in accordance with the image classification to which the selected shot VD corresponds among the plurality of image classifications.

The program can realize the above-described image processing device in a device such as the portable terminal 2, the switcher 3, the cloud switcher 4, the computer device 5, and the imaging device 1, for example.

The program can be recorded in advance in an HDD serving as a recording medium embedded in a device such as a computer device or a ROM or the like in a microcomputer that includes a CPU.

Alternatively, the program can be stored (recorded) temporarily or perpetually on a removable recording medium such as a flexible disc, a compact disc read only memory (CD-ROM), a magnet optical (MO) disc, a digital versatile disc (DVD), a Blu-ray disc (registered trademark), a magnetic disk, a semiconductor memory, or a memory card. The removable recording medium can be provided as so-called package software.

The program can be installed from the removable recording medium to a personal computer and can also be downloaded from a download site via a network such as a local area network (LAN) or the Internet.

Such a program is appropriate for broad provision of the imaging processing device according to the embodiment. For example, by downloading the program to a personal computer, a portable information processing device, a mobile phone, a game device, a video device, a personal digital assistant (PDA), or the like, it is possible to cause the personal computer or the like to function as the image processing device according to the present disclosure.

The advantageous effects described in the present specification are merely exemplary and are not limitative, and other advantageous effects may be achieved.

The present technology can be configured as follows.

(1)

An image processing device including:

a main image selection unit configured to select one image as a main image among a plurality of images; and a period setting unit configured to set a continuous period length for which a selected selection image selected by the main image selection unit is continued as the main image in accordance with an image classification to which the selection image corresponds among a plurality of image classifications.

(2)

The image processing device according to (1), wherein the continuous period length is a length of a period from which the selection image is switched to a main image until another image selected after the selection image among the plurality of images by the main image selection unit is switched to a main image.

(3)

The image processing device according to (1) or (2), wherein the image classification is determined based on subject information of an image.

(4)

The image processing device according to any one of (1) to (3), further including:

a switching control unit configured to perform control such that the main image is switched from the selection image to another image among the plurality of images when the continuous period length is reached, or when a predetermined situation is detected and a continuous period of a current main image passes a first period length shorter than the continuous period length.

(5)

The image processing device according to (4), wherein, when an image classification of an image serving as a main image is changed from the image classification upon selection of the selection image as the main image by the main image selection unit, the switching control unit performs control such that the main image is switched to another image under a condition that the first period length shorter than the continuous period length set by the period setting unit passes.

(6)

The image processing device according to (4) or (5), wherein, when an image of which the image classification is a main subject image occurs in an image not serving as the main image, the switching control unit performs control such that the main image is switched to an image of the image classification indicating the main image as a main subject image, under a condition that the continuous period passes the first period length shorter than the continuous period length set by the period setting unit.

(7)

The image processing device according to any one of (1) to (6), wherein, when a period for which the image classification of an image is a whole image is not a main image passes a second period length, the main image selection unit selects the image of the image classification indicating the whole image as a new main image among the plurality of images.

(8)

The image processing device according to any one of (1) to (6), wherein the image classification is an image classification including one of at least a main subject image, a sub-subject image, and a whole image.

(9)

The image processing device according to (8), wherein the period setting unit sets the continuous period length in accordance with the image classification so that the main subject image has a longest continuous period length and the whole image or the sub-subject image has a shortest continuous period length.

(10)

The image processing device according to any one of (1) to (9), wherein the main image selection unit selects an image serving as a subsequent main image through a process in accordance with a predetermined selection rule among the plurality of images other than the image serving as the main image.

(11)

The image processing device according to (10), wherein one process in accordance with the selection rule is a process of, when the image serving as the main image is not a main subject image and there is an image serving as another main subject image, setting the image serving as the other main subject image as a candidate for the subsequent main image.

(12)

The image processing device according to (10) or (11), wherein one process in accordance with the selection rule is a process of, when the image serving as the main image is a main subject image and there is an image serving as another main subject image, setting the image serving as the other main subject image as a candidate for the subsequent main image.

(13)

The image processing device according to any one of (10) to (12), wherein one process in accordance with the selection rule is a process of excluding an image of the same image classification as the image serving as the main image from candidates for the subsequent main image.

(14)

The image processing device according to any one of (10) to (13), wherein one process in accordance with the selection rule is a process of excluding an image including the same sub-subject as a subject of the image serving as the main image from candidates for the subsequent main image.

(15)

The image processing device according to any one of (10) to (14), wherein one process in accordance with the selection rule is a process of excluding a sub-subject image from candidates for a subsequent main image when the image serving as the main image is a whole image and the main subject image is another image among the plurality of images.

(16)

The image processing device according to any one of (10) to (15), wherein the main image selection unit selects a whole image as the subsequent main image through the process in accordance with the selection rule when there is no more image which is a candidate for the image serving as the subsequent main image other than the whole image.

(17)

The image processing device according to any one of (1) to (16), wherein the main image selection unit selects an image serving as a subsequent main image through a weighted selection process on each image among images which are candidates for the subsequent main image.

(18)

The image processing device according to any one of (1) to (17), wherein, when there is no main subject image among images which are candidates for the subsequent main image, the main image selection unit selects a subsequent main image through random lottery processing on the images which are the candidates.

(19)

An image processing method performed by an image processing device, the method including:

selecting one image as a main image among a plurality of images; and setting a continuous period length for which a selected selection image is continued as the main image in accordance with an image classification to which the selection image corresponds among a plurality of image classifications.

(20)

A program causing an image processing device to perform:

a process of selecting one image as a main image among a plurality of images; and a process of setting a continuous period length for which a selected selection image is continued as the main image in accordance with an image classification to which the selection image corresponds among a plurality of image classifications.

REFERENCE SIGNS LIST

1 Imaging device
2 Portable terminal
3 Switcher
4 Cloud switcher
5 Computer device
6 Network
11 Lens system
12 Imaging element unit
13 Camera signal processing unit
14 Recording control unit
15 Display unit
16 Output unit
17 Operation unit
18 Camera control unit
19 Memory unit
22 Driver unit
31 Main image selection unit
32 Period setting unit
33 Switching control unit
34 Subject recognition unit
35 Shot analysis unit
36 Crop processing unit
37 Monitor display control unit
40 Switching unit
70 Information processing device
71 CPU
72 ROM
73 RAM
74 Bus
75 Input/output interface
76 Input unit
77 Display unit
78 Sound output unit
79 Storage unit
80 Communication unit
81 Removable recording medium
82 Drive
T1 Period length
T2 Period length
MP Main image
VD, VD1, VD2, VD3, . . . VDn Shot
PD Image classification

The invention claimed is:

1. An image processing device comprising:

main image selection circuitry configured to select one image as a main image among a plurality of images; and period setting circuitry configured to set a continuous period length for which a selected selection image selected by the main image selection circuitry is continued as the main image in accordance with an image classification to which the selection image corresponds among a plurality of image classifications, wherein the main image selection circuitry selects an image serving as a subsequent main image through a process in accordance with a predetermined selection rule among the plurality of images other than the image serving as the main image, and the main image selection circuitry selects a whole image as the subsequent main image through the process in accordance with the selection rule when there is no more image which is a candidate for the image serving as the subsequent main image other than the whole image.

2. The image processing device according to claim 1, wherein the continuous period length is a length of a period from when the selection image is switched to a main image until another image selected after the selection image among the plurality of images by the main image selection circuitry is switched to a main image.

3. The image processing device according to claim 1, wherein the image classification is determined based on subject information of an image.

4. The image processing device according to claim 1, further comprising:

switching control circuitry configured to perform control such that the main image is switched from the selection image to another image among the plurality of images when the continuous period length is reached, or when a predetermined situation is detected and a continuous period of a current main image passes a first period length shorter than the continuous period length.

5. The image processing device according to claim 4, wherein, when an image classification of an image serving as a main image is changed from the image classification upon selection of the selection image as the main image by the main image selection circuitry, the switching control circuitry performs control such that the main image is switched to another image under a condition that the first period length shorter than the continuous period length set by period setting unit passes.

6. The image processing device according to claim 4, wherein, when an image of which the image classification is a main subject image occurs in an image not serving as the main image, the switching control circuitry performs control such that the main image is switched to an image of the image classification indicating the main image as a main subject image, under a condition that the continuous period passes the first period length shorter than the continuous period length set by the period setting circuitry.

7. The image processing device according to claim 1, wherein, when a period for which the image classification of an image is a whole image is not a main image passes a second period length, the main image selection circuitry selects the image of the image classification indicating the whole image as a new main image among the plurality of images.

8. The image processing device according to claim 1, wherein the image classification is an image classification including one of at least a main subject image, a sub-subject image, and a whole image.

9. The image processing device according to claim 8, wherein the period setting circuitry sets the continuous period length in accordance with the image classification so that the main subject image has a longest continuous period length and the whole image or the sub-subject image has a shortest continuous period length.

10. The image processing device according to claim 1, wherein one process in accordance with the selection rule is a process of, when the image serving as the main image is not a main subject image and there is an image serving as another main subject image, setting the image serving as the other main subject image as a candidate for the subsequent main image.

11. The image processing device according to claim 1, wherein one process in accordance with the selection rule is a process of, when the image serving as the main image is a main subject image and there is an image serving as another main subject image, setting the image serving as the other main subject image as a candidate for the subsequent main image.

12. The image processing device according to claim 1, wherein one process in accordance with the selection rule is a process of excluding an image of the same image classification as the image serving as the main image from candidates for the subsequent main image.

13. The image processing device according to claim 1, wherein one process in accordance with the selection rule is a process of excluding an image including the same sub-subject as a subject of the image serving as the main image from candidates for the subsequent main image.

14. The image processing device according to claim 1, wherein one process in accordance with the selection rule is a process of excluding a sub-subject image from candidates for a subsequent main image when the image serving as the main image is a whole image and the main subject image is another image among the plurality of images.

15. The image processing device according to claim 1, wherein the main image selection circuitry selects an image serving as a subsequent main image through a weighted selection process on each image among images which are candidates for the subsequent main image.

16. An image processing device comprising:
main image selection circuitry configured to select one image as a main image among a plurality of images, and
period setting circuitry configured to set a continuous period length for which a selected selection image selected by the main image selection circuitry is continued as the main image in accordance with an image classification to which the selection image corresponds among a plurality of image classifications, wherein,
when there is no main subject image among images which are candidates for the subsequent main image, the main image selection circuitry selects a subsequent main image through random lottery processing on the images which are the candidates.

17. An image processing method performed by an image processing device, the method comprising:
selecting one image as a main image among a plurality of images; and
setting a continuous period length for which a selected selection image is continued as the main image in accordance with an image classification to which the selection image corresponds among a plurality of image classifications, wherein the method further comprises
when there is no main subject image among images which are candidates for the subsequent main image, selecting a subsequent main image through random lottery processing on the images which are the candidates.

18. A non-transitory computer readable medium storing instructions which when executed by a processor cause the processor to perform the method according to claim 17.

* * * * *